United States Patent
Yeung et al.

(10) Patent No.: US 10,999,155 B2
(45) Date of Patent: May 4, 2021

(54) SYSTEM AND METHOD FOR HYBRID AND ELASTIC SERVICES

(71) Applicant: Cisco Technology, Inc., San Jose, CA (US)

(72) Inventors: Michael Yeung, Ontario (CA); Elie El Ajaltouni, Ontario (CA); Andrew Phillips, Dubai (AE); Peter Andersen, Ottawa (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 327 days.

(21) Appl. No.: 15/794,753

(22) Filed: Oct. 26, 2017

(65) Prior Publication Data

US 2019/0132211 A1   May 2, 2019

(51) Int. Cl.
*H04L 12/24* (2006.01)
*H04L 12/26* (2006.01)
*H04L 29/08* (2006.01)

(52) U.S. Cl.
CPC ........ *H04L 41/145* (2013.01); *H04L 41/0816* (2013.01); *H04L 41/0896* (2013.01); *H04L 43/0876* (2013.01); *H04L 43/16* (2013.01); *H04L 67/10* (2013.01)

(58) Field of Classification Search
CPC ............ H04L 41/0816; H04L 41/0896; H04L 41/145; H04L 43/0876; H04L 43/16; H04L 67/10
See application file for complete search history.

(56) References Cited

U.S. PATENT DOCUMENTS

| | | | |
|---|---|---|---|
| 9,384,028 B1 | 7/2016 | Felstaine et al. | |
| 9,430,262 B1 * | 8/2016 | Felstaine | G06F 9/45558 |
| 9,462,427 B2 | 10/2016 | Patel et al. | |
| 9,760,428 B1 * | 9/2017 | Felstaine | H04L 41/022 |
| 9,767,445 B1 * | 9/2017 | Brooker | G06Q 20/14 |
| 2014/0223012 A1 * | 8/2014 | Agarwala | H04L 41/0836 709/226 |
| 2014/0317261 A1 | 10/2014 | Shatzkamer et al. | |

(Continued)

OTHER PUBLICATIONS

International Search Report and Written Opinion from the International Searching Authority, dated Jan. 29, 2019, 14 pages, for corresponding International Patent Application No. PCT/US18/57444.

(Continued)

*Primary Examiner* — Jason D Recek
(74) *Attorney, Agent, or Firm* — Polsinelli PC

(57) ABSTRACT

A network function virtualization (NFV) platform can support hybrid and elastic scaling and recovery services. In one example, a system can deploy a cloud virtual network function manager (VNFM) and one or more cloud virtual network functions (VNFs) on a cloud. The system can monitor, via the cloud VNFM, a local VNFM on a local network, the cloud VNFM, and/or the one or more cloud VNFs. Based on the monitoring, the system can determine, via the cloud VNFM, a respective status of the local VNFM, the cloud VNFM, and/or the one or more cloud VNFs. Based on the respective status of the local VNFM, the cloud VNFM, and/or the one or more cloud VNFs, the system can then scale, via the cloud VNFM, the local VNFM, the cloud VNFM, and/or the one or more cloud VNFs.

18 Claims, 13 Drawing Sheets

(56) References Cited

U.S. PATENT DOCUMENTS

| | | | |
|---|---|---|---|
| 2016/0359805 A1 | 12/2016 | Spraggs et al. | |
| 2016/0366009 A1* | 12/2016 | Bedekar | H04L 47/70 |
| 2017/0063989 A1 | 3/2017 | Lagnouev et al. | |
| 2017/0099362 A1 | 4/2017 | Almond et al. | |
| 2017/0116019 A1 | 4/2017 | Miller | |
| 2017/0150399 A1* | 5/2017 | Kedalagudde | H04L 43/16 |
| 2017/0353361 A1* | 12/2017 | Chopra | H04L 41/147 |
| 2018/0060135 A1* | 3/2018 | Lacey | G06F 9/5077 |
| 2018/0145889 A1 | 5/2018 | Xu | H04L 41/0806 |
| 2019/0089814 A1* | 3/2019 | Rimac | H04L 41/0813 |
| 2019/0379728 A1* | 12/2019 | Hellstrom | G06F 9/5072 |

OTHER PUBLICATIONS

"Network Function Virtualization (NFV) Management and Orchestration," GS NFV-MAN 001 V0.6.3, Sep. 22, 2014, pp. 1-197.

* cited by examiner

SYSTEM AND METHOD FOR HYBRID AND ELASTIC SERVICES

TECHNICAL FIELD

The subject matter of this disclosure relates in general to the field of network function virtualization, and more specifically to dynamic hybrid elastic services in network function virtualization environments.

BACKGROUND

Network function virtualization (NFV) can offer network operators a variety of benefits when managing and provisioning network services. For example, a network operator can increase utilization of computing infrastructure (e.g., computing, storage, and network resources) and decrease consumption of other resources (e.g., power, physical space, cooling, site-to-site management, etc.) by virtualizing network functions. The network operator can run software that performs specific network functions (i.e., virtual network functions (VNFs)) on commodity hardware or commercial-off-the-shelf (COTS) hardware (i.e., general purpose servers and storage devices, etc.). This can reduce the number of hardware devices in a network and different geographic locations that are serviced by certain physical network appliances. Unfortunately, current NFV platforms are inflexible and have limited orchestration capabilities.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1A:
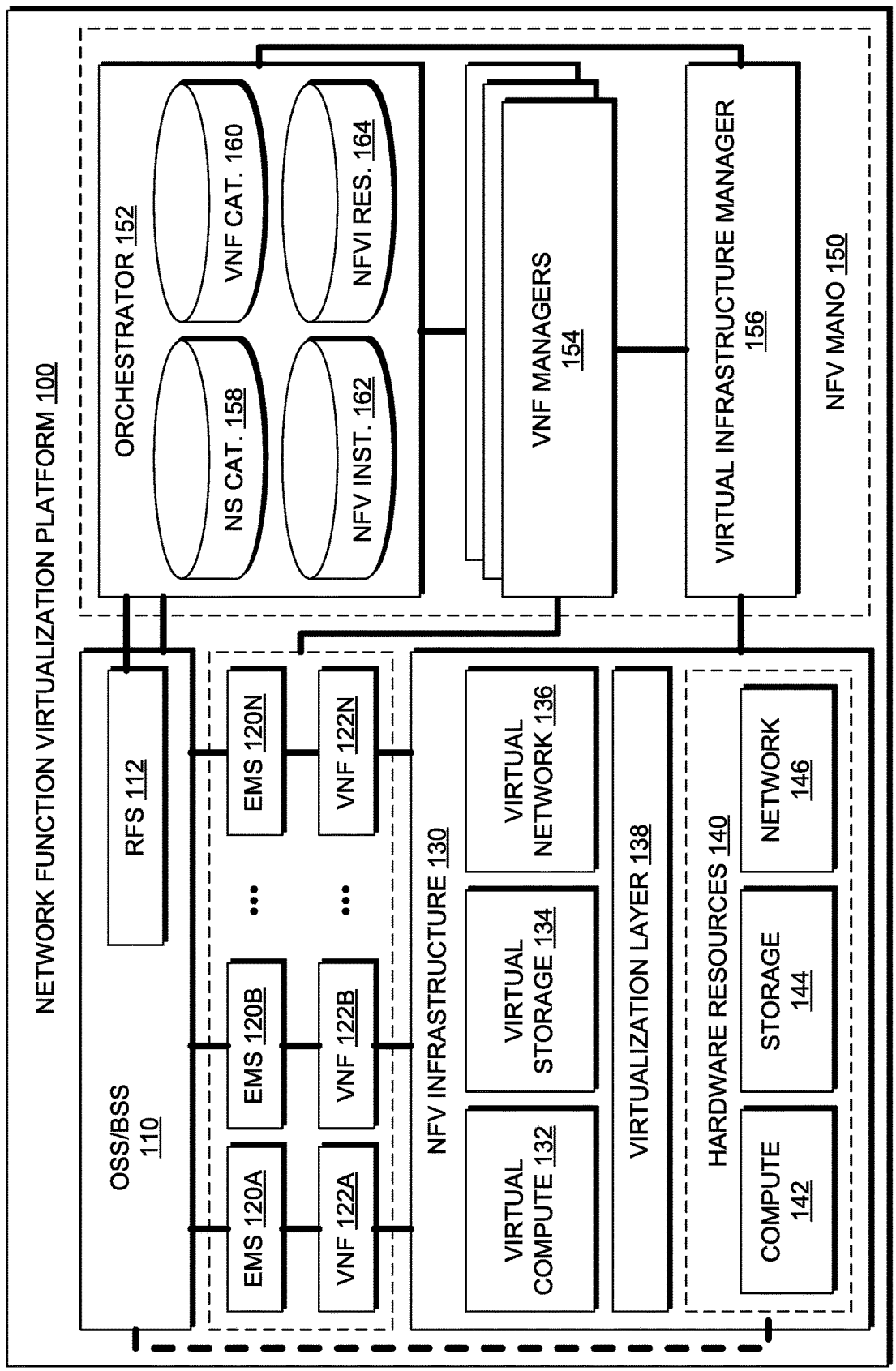
FIG. 1A illustrates an example of a network function virtualization platform in accordance with various embodiments.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed are systems, methods, and computer-readable storage media for hybrid and elastic services. As disclosed herein, a network function virtualization (NFV) platform can support hybrid and elastic services, including scaling and recovery services. For example, a system, such as a cloud controller, can deploy a cloud virtual network function manager (VNFM) and one or more cloud virtual network functions (VNFs) on a cloud environment. The system can monitor, via the cloud VNFM, a local VNFM on a local network, the cloud VNFM itself, and/or the one or more cloud VNFs. Based on the monitoring, the system can determine, via the cloud VNFM, a respective status (e.g., a load) of the local VNFM, the cloud VNFM, and/or the one or more cloud VNFs. The system can also monitor and determine, via the cloud VNFM, a respective status of one or more local VNFs on the local network. The cloud VNFM, the local VNFM, the one or more cloud VNFs, and the one or more local VNFs can be associated with a particular application service Based on the respective status of the local VNFM, the cloud VNFM, and/or the one or more cloud VNFs, the system can then scale, via the cloud VNFM, at least one of the local VNFM, the cloud VNFM, and/or the one or more cloud VNFs. The system can also scale, via the cloud VNFM, the one or more local VNFs based on their respective status. The system can scale in or scale out the local VNFM, the cloud VNFM, the one or more cloud VNFs, and/or the one or more cloud VNFs as necessary or desired based on the respective status. For example, the system can determine underload or overload conditions of VNFMs and VNFs deployed on the cloud or the local network, and scale VNFs or VNFMs in/out/up/down based on underload or overload conditions by deploying, migrating, or removing resources and/or VNF/VNFM instances.

Description

To support NFV, a network can include a management and orchestration (MANO) system that can assemble, recombine, and manage elements of a virtualized environment in an automated manner. The European Telecommunications Institute (ETSI) Industry Specification Groups (ISG) includes an NFV MANO working group that defines a high-level functional architectural framework for NFV management and orchestration system for facilitating development of standardized and open interfaces between VNFs and their associated computing infrastructure and to promote interoperability among different vendors.

FIG. 1A illustrates a block diagram representing NFV platform 100. One of ordinary skill in the art will understand that, for NFV platform 100 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not necessarily depart from the scope of the present disclosure.

In this example, NFV platform 100 includes several components or functional blocks that can provide an NFV MANO architectural framework, including operations support system (OSS)/business support system (BSS) 110; element management system (EMSs) 120A, 120B, . . . , 120N (collectively, "120"); VNFs 122A, 122B, . . . , and 122N (collectively, "122"); NFV infrastructure (NFVI) 130; and NFV MANO system 150. OSS/BSS 110 can include a collection of systems and management applications that a network operator uses to run its business. In some embodiments, OSS/BSS 110 may provide for management and orchestration of legacy systems and may have full end-to-end visibility of services provided by legacy network functions in the network. In some embodiments, OSS/BSS 110 can include one or more resource-facing services (RFS) 112 that can operate as an interface between the network operator's product offerings or customer-facing services (CFS) and lower-level network resources (e.g., network service (NS) catalog 148, VNF catalog 150, NFV instances repository 152, NFVI resources respoitory 154, etc.).

EMSs 120 can include systems and applications for managing network elements. EMSs 120 can provide for fault management for network functions performed by VNFs 122, configuration for the network functions performed by VNFs 122, accounting for the usage of VNF functions, performance measurement for the functions of VNFs 122, and security management for the VNF functions (i.e., FCAPS).

VNFs 122 can include virtualized implementations of physical network functions (PNFs), such as network address translators (NATs), firewalls, distributed denial of service (DDoS) mitigators, load balancers, intrusion prevent systems (IPSs), intrusion detection systems (IDSs), wide area network (WAN) optimizers, etc. In some cases, a VNF can include multiple internal components. For example, a single VNF can be made of multiple virtual instances (i.e., virtual machines (VMs), containers, or other virtual partitions of one or more computing devices (collectively, "virtual infrastructure")) in which each virtual instance hosts an individual component of the VNF. In some cases, a VNF can be a single virtual instance. A network operator can chain multiple VNFs 122 (and sometimes PNFs (not shown)) to create a network service.

NFVI 130 includes hardware and software components that make up the environment for the deployment, management, and execution of VNFs 122. In some cases, NFVI 130 can span across several geographic locations (sometimes referred to as NFVI points of presence (PoPs)). From a VNF's perspective, NFVI 130 can appear to be a black box for providing the VNF with specified resources as there can be numerous possible implementations for NFVI 130. In this example, NFVI 130 is a collection of virtualized resources, including virtual computing resources 132, virtual storage resources 134, and virtual network resources 136; virtualization layer 138; and hardware resources 140, including physical computing resources 142, physical storage resources 144, and physical network resources 146.

There are various approaches for implementing NFVI 130, and particularly virtual computing resources 132. Example approaches can include hypervisor-based virtualization, container-based virtualization, and a hybrid of hypervisor-based virtualization and container-based virtualization, among others. In hypervisor-based virtualization, software emulates the hardware of a physical computing device so that an entire, unmodified operating system can run within the emulated or virtual environment (i.e., a VM). A physical server can run one or more VMs at once, and a hypervisor or virtual machine monitor (VMM) can manage the VMs and allocate the resources of the server among them. Hypervisors can run as hosted software within a conventional operating system, or run on "bare metal" or directly on physical hardware. In container-based virtualization, software provides self-contained execution environments (i.e., containers) that rely on the same operating system kernel. A container engine isolates applications executing within each environment, such as by using different namespaces for each environment or container. An example of a hybrid implementation can involve using a hypervisor (hosted or bare-metal) on some servers of a network and a container engine on other servers of the network. Virtual computing resources 132 can thus include one or more VMs, one or more containers, and/or one or more other virtual partitions. In some embodiments, however, VNFs 122 can also run on non-virtualized servers as applications hosted by an operating system or as bare metal applications.

Virtual storage resources 134 can include block storage resources, file storage resources, and the like. In block virtualization, a network operator abstracts logical storage from physical storage such that data is accessible without regard to physical storage or heterogeneous structure. In file virtualization, the network operator eliminates dependencies between the data accessed at the file level and the physical location of the files. Block data or files may physically reside on the hard disk drives (HDD), solid state drives (SSD), or other type of media of a multitude of physical servers. Clients, however, can access a set of associated blocks or files from a single logical location that maps to physical locations.

Virtualization layer 138 can abstract and logically partition hardware resources 140 to decouple VNF software from the underlying hardware. This can facilitate deployment of VNFs 122 using different types of hardware, such as physical devices having central processing units (CPUs) based on the reduced instruction set computer (RISC) architecture (e.g., Advanced RISC Machine (ARM) architecture); the Microprocessor without Interlocked Pipeline Stages (MIPS) architecture; the Power architecture; Scalable Processor Architecture (SPARC); or the complex instruction set computer (CISC) architecture (e.g., the x86 architecture) or physical devices having architectures that include a Front-Side Bus (FSB), Dual Independent Buses (DIB), Dedicated High-Speed Interconnects (DHSI), Intel QuickPath Interconnects (QPI), etc. Virtualization layer 138 enables VNF software to use the underlying virtualized infrastructure, and can also operate as an interface to provide virtualized resources to VNFs 122. Virtualization layer 138 can include hypervisors, containers, hardware abstraction layers (HAL), hardware drivers, or other intermediary software between virtual computing resources 132, virtual storage resources 134, and virtual network resources 136 and hardware resources 140 for providing interoperability between VNFs 122 and hardware resources 140.

In configurations that implement virtualization in the network domain, virtualization layer 138 can abstract network hardware to realize virtualized network paths that provide connectivity between virtual instances of a VNF and/or between different VNFs. Several techniques allow this, including network abstraction layers that isolate resources via virtual networks and network overlays, including Virtual Local Area Network (VLAN), Virtual Private LAN Service (VPLS), Virtual Extensible Local Area Network (VxLAN), Network Virtualization using Generic Routing Encapsulation (NVGRE), etc. Other possible forms of virtualization of the transport network include centralizing the control plane of the transport network and separating it from the forwarding plane and isolating the transport medium (e.g., in optical wavelengths, etc.).

Hardware resources 140 include computing resources 142, storage resources 144, and network resources 146 that provide processing, storage and connectivity to VNFs 122 through virtualization layer 138. Hardware resources 140 are typically "commodity" devices or commercial-off-the-shelf (COTS) hardware but some embodiments may utilize some purpose-built hardware for certain functionality. Computing resources 142 can include physical servers having a variety of CPUs, architectures, memory capacity, types of memory, etc. Storage resources 144 can include shared network attached storage (NAS) and/or storage that resides on a commodity or COTS server. In some embodiments, a network operator may pool computing resources 142 and storage resources 144. Network resources 144 can include devices that provide switching functions (e.g., switches, routers, and wired or wireless links).

NFV MANO system 150 manages NFVI 130 and orchestrates the allocation of resources needed by VNFs 122 and network services (i.e., chains of VNFs 112 that may also include PNFs). In this example, NFV MANO system 150 includes orchestrator 152, VNF managers (VNFMs) 154, and virtual infrastructure manager (VIM) 156 for management and orchestration of NFVI 130, VNFs 122, and network services; fault and performance management of network services and VNFs 122; policy management; and testing of network services and VNFs 122.

Orchestrator 152 is generally responsible for orchestration of the resources of NFVI 130 across multiple VIMs 156, and lifecycle management of network services. Tasks for management and orchestration of NFVI resources can include providing VNFs 122 with the resources they need and provisioning connectivity to PNFs when a network service includes a PNF that needs to connect to a VNF or when a network service spans multiple NFVI-PoPs. Orchestrator 152 is also responsible for network service lifecycle management, including operations for on-boarding a network service (i.e., registering a network service in network service catalog 158 and ensuring that orchestrator 152 can access templates required by the network service, including VNF templates stored in VNF catalog 160 and NFVI templates stored in NFVI resource repository 164); instantiating a network service; scaling a network service; updating and/or upgrading a network service; creating, deleting, querying, and updating VNF forwarding graphs associated with a network service; and terminating network services (i.e., requesting for the termination of constituent VNF instances, requesting for the release of NFVI resources associated with a network service, and returning them to NFVI 130). An example of an implementation of orchestrator 152 is Cisco® Network Service Orchestrator (NSO).

Data repositories for supporting the operations of NFV MANO 150 can include network service catalog 158, VNF catalog 160, NFV instances repository 162, and NFVI resources repository 164 for performing its various operations. Network service catalog 158 can store information for on-boarded network services, including network service deployment templates (sometimes referred to as network service descriptors (NSDs)), virtual link descriptors (VLDs), and VNF forwarding graph descriptors (VNFFGDs).

VNF catalog 160 can store information for on-boarded VNFs, including VNF deployment templates (sometimes referred to as VNF Descriptors (VNFD)), software images, manifest files, etc.). In some embodiments, orchestrator 152 and VNF managers 154 can query VNF catalog 160 for finding and retrieving a VNFD, validating a VNF, and checking instantiation feasibility.

NFVI instances repository 162 can store information for instantiated VNF and network service instances. A VNF record can store information for a particular running VNF instance, and a network service record can store information for a particular running network service instance. Various components of NFV MANO 150 can update these records during the lifecycles of the respective instances to represent changes resulting from execution of NS lifecycle management operations and/or VNF lifecycle management operations.

NFVI resources repository 164 can store information for reserving, allocating, and monitoring the resources of NVFI 130. In some cases, VIM 156 can provide an interface for orchestrator 152 and VNF managers 154 to accessing these functions.

VNF managers 154 can manage lifecycles of VNFs 122, including operations such as instantiating, scaling (i.e., increasing or reducing the number of VNF instances for a particular network function), updating and/or upgrading, and terminating VNFs 122. VNF managers 154 can also perform VNF instantiation feasibility checking, VNF instance-related collection of NFVI performance measurement results and faults/events information, VNF instance assisted or automated healing, VNF lifecycle management change notification, management of the integrity of VNFs 122 through their lifecycles. An individual VNF manager can serve a single VNF or multiple VNFs.

VIM 156 is responsible for resource management, including maintaining inventory of the resources of NFVI 130 (i.e., virtual computing resources 132, virtual storage resources 134, virtual network resources 136, virtualization layer 138, computing resources 142, storage resources 144, network resources 146, etc.); allocation of virtualization resources (e.g., invoking hypervisors to instantiate VMs, invoking container engines to instantiate containers, reserving servers and storage servers/devices, establishing network connectivity, etc.); managing infrastructure resource and allocation (e.g., increasing resources to virtual instances, improving energy efficiency, and reclaiming resources, etc.). VIM 156 can also provide for visibility into and management of NFVI 130, root cause analysis of performance issues of NFVI 130, collection of infrastructure fault information, and collection of information for capacity planning, monitoring, and optimization.

Figure 1B:
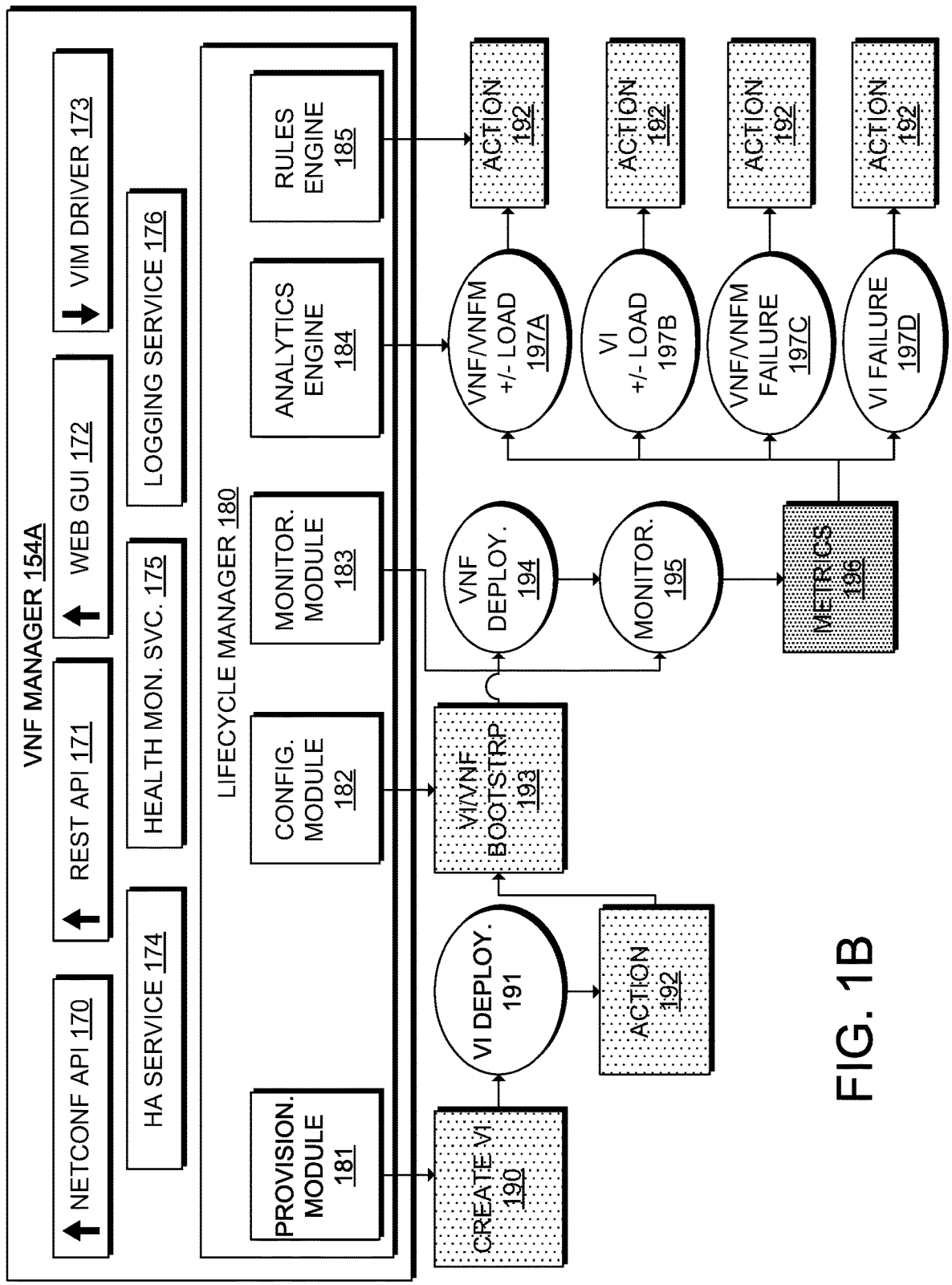
FIG. 1B illustrates an example of a virtual network function manager in accordance with various embodiments.

FIG. 1B illustrates a block diagram representing VNF manager (VNFM) 154A, which can be an example of an implementation of VNF managers (VNFMs) 154. In this example, VNF manager 154A includes various interfaces for supporting "northbound" (from the perspective of VNF manager 154A) interactions, including NETCONF/YANG application programming interface (API) 170, restful state transfer (REST) API 171, and web graphical user interface (GUI) 172; interfaces for providing "southbound" (from the perspective of VNF manager 154A) interactions, including VIM driver 173; services, including high availability (HA) service 174, health monitoring service 175, and logging service 176; and lifecycle manager 180.

NETCONF is a network management protocol to install, manipulate, operate, and delete the configuration of network devices. In some cases, an orchestrator (e.g., orchestrator 152) can communicate with VNF manager 154A using open NETCONF protocol and YANG based data models. In this manner, VNF manager 154A can manage VNFs (e.g., VNFs 122) at a device level, and the orchestrator can manage the entire network service lifecycle. Together, the orchestrator and VNF manager can provide a complete orchestration solution that spans across both physical and virtual infrastructure. In some cases, along with NETCONF notifications, NETCONF/YANG API 170 can also provide operational data, such as a list of all tenants, networks, and deployments in VNF manager 154A.

Table 1 provides an example of a NETCONF request to create a tenant, and Table 2 provides an example of a NETCONF notification after VNF manager 154A successfully creates a tenant.

TABLE 1

Example of a NETCONF request to create a tenant.

| | |
|---|---|
| 1: | \<rpc message-id="1" xmlns="urn:ietf:params:xml:ns:netconf:base:1.0"\> |
| 2: | \<edit-config\> |
| 3: | \<source\> |
| 4: | \<running/\> |
| 5: | \</source\> |
| 6: | \<config\> |
| 7: | \<esc_datamodel xmlns="www.cisco.com/esc/esc"\> |
| 8: | \<tenants\> |
| 9: | \<tenant\> |
| 10: | \<name\>mytenant\</name\> |
| 11: | \</tenant\> |
| 12: | \</tenants\> |
| 13: | \</esc_datamodel\> |
| 14: | \</config\> |
| 15: | \</edit-config\> |
| 16: | \</rpc\> |

TABLE 2

Example of a NETCONF notification indicating successful creation of a tenant.

| | |
|---|---|
| 1: | \<notification xmlns="urn:ietf:params:xml:ns:netconf:notification:1.0"\> |
| 2: | \<eventTime\>2015-05-05T19:38:27.71+00:00\</eventTime\> |
| 3: | \<escEvent xmlns="www.cisco.com/esc/esc"\> |
| 4: | \<status\>SUCCESS\</status\> |
| 5: | \<status_message\>Tenant successfully created\</status_message\> |
| 6: | \<tenant\>mytenant\</tenant\> |
| 7: | \<vm_source/\> |
| 8: | \<vm_target/\> |
| 9: | \<event\> |
| 10: | \<type\>CREATE_TENANT\</type\> |
| 11: | \</event\> |
| 12: | \</escEvent\> |
| 13: | \</notification\> |

REST API 171 is a programmatic interface to VNF manager 154A that uses a representational state transfer (REST) architecture. REST API 171 accepts and returns Hypertext Transfer Protocol (HTTP) or HTTP Secure (HTTPS) messages that contain JavaScript Object Notation (JSON) or Extensible Markup Language (XML) documents. An NFV platform (e.g., NFV platform 100) can use any programming language to generate the messages and the JSON or XML documents that contain the API methods or managed object (MO) descriptions. REST API 171 can include classes (i.e., templates that define the properties and states of objects in the management information tree (MIT)); methods (i.e., actions that REST API 171 performs on one or more objects); and types (i.e., object properties that map values to the object state). In some cases, REST API 171 can receive a request and place the request in a transactor queue in first in, first out (FIFO) order. The transactor can retrieve the request from the queue, interpret the request, and perform an authorization check. After confirmation of the request, the transactor can update the MIT. REST API 171 can complete these operations in a single transaction.

Table 3 provides an example of a REST request to create a tenant, and Table 4 provides an example of a REST response after VNF manager 154A successfully creates a tenant.

TABLE 3

Example of a REST request to create a tenant.

| | |
|---|---|
| 1: | POST /v0/tenants/123 HTTP/1.1 |
| 2: | Host: client.host.com |
| 3: | Content-Type: application/xml |
| 4: | Accept: application/xml |
| 5: | Client-Transaction-Id: 123456 |
| 6: | Callback:/createtenantcallback |
| 7: | <?xml version="1.0" encoding="UTF-8"?> |
| 8: | <tenant xmlns="urn:ietf:params:xml:ns:netconf:base:1.0"> |
| 9: | <name>xyz</name> |
| 10: | <enabled>true</enabled> |
| 11: | <description>A description...</description> |
| 12: | </tenant> |

TABLE 4

Example of a REST response indicating successful creation of a tenant.

| | |
|---|---|
| 1: | HTTP/1.1 201 OK |
| 2: | Content-Type: application/xml; charset=UTF-8 |
| 3: | Content-Length: 200 |
| 4: | Date: Sun, 1 Jan 2011 9:00:00 GMT |
| 5: | ESC-Transaction-Id: 123456 |
| 6: | ESC-Status-Code: 200 |
| 7: | ESC-Status-Message: Success ... |
| 8: | <?xml version="1.0" encoding="UTF-8"?> |
| 9: | <tenant> |
| 10: | <external_tenant_id>234243490854004</external_tenant_id> |
| 11: | <internal_tenant_id>434344896854965</internal_tenant_id> |
| 12: | <name>xyz</name> |
| 13: | <enabled>true</enabled> |
| 14: | <description>A description...</description> |
| 15: | </tenant> |

Web GUI 172 is a web-based tool for an administrator to create, read, update, or delete (CRUD) operations related to VNF lifecycle management. Web GUI 172 can enable an administrator to create and view the real-time activities of VNF manager 154A such as deploying, undeploying, healing, and scaling VNFs.

VIM driver 173 is a component that enables VNF manager 154A to interface with a particular virtualization platform, such as OpenStack provided by the OpenStack Foundation of Austin, Tex. or vCenter provided by VMware Inc. of Palo Alto, Calif.

HA service 174 can prevent single point of failure and minimize shutdown time of VNF manager 154A. In some cases, HA service 174 can implement a primary and standby model. If the primary VNF manager instance fails, the standby VNF manager instance can automatically take over the services provided by the primary instance. In some cases, HA service 200 can resolve single point failures due to network failures, power failures, a dead VM instance, scheduled downtime, hardware issues, and internal application failures, among other possibilities.

Health monitoring service 175 provides an interface (e.g., REST, Simple Object Access Protocol (SOAP), service oriented architecture (SOA), resource oriented architecture (ROA) API) for third party software to monitor the health of VNF manager 154A and its services. Using the API, the third party software can query the health condition of VNF manager 154A periodically to check whether VNF manager 154A is in service. In response to the query, the API can provide status code and messages. Table 5 provides an example of status codes and associated health monitoring messages.

TABLE 5

Example of health monitoring messages.

| Status Code | Message |
|---|---|
| 2000 | Services running. |
| 2010 | Services running but HA node is not reachable. |
| 2020 | Services running but one or more VIM services are not reachable. |
| 2030 | Services running but VIM credentials not provided. |
| 2100 | Services running but HA node is not reachable and one or more VIM services are not reachable. |
| 5010 | VNF manager service, VNF manager not running. |
| 5020 | VNF manager service, NETCONF API not running. |
| 5030 | VNF manager service, health monitoring service not running. |
| 5040 | VNF manager service, VIM manager not running. |

Logging service 176 logs messages of events throughout the lifecycle of each VNF deployed by VNF manager 154A. The messages can be external messages, messages from VNF manager 154A to other external systems, error messages, warnings, events, failures, and the like. Logging service 176 can support classifications (i.e., logging categories) and tags (i.e., custom logging categories) to facilitate search of logs. In some examples, VNF manager 154A can expose logging service 176 to third party software for the software to query and retrieve logs.

Lifecycle manager 180 manages the lifecycle of each VNF/VM deployed by VNF manager 154A. Lifecycle manager 180 can include a number of components or engines for performing specific lifecycle management tasks. In this example, the components of lifecycle manager 180 include provisioning module 181, configuration module 182, monitoring module 183, analytics engine 184, and rules engine 185. The shaded boxes in FIG. 1B represent specific tasks or actions, and the ellipses represent particular lifecycle stages. The lifecycle of a service can begin with a request for a new service to VNF manager 154A (e.g., via NETCONF API 170, REST API 171, Web GUI 172, etc.).

Provisioning module 181 can instantiate 190 one or more VMs, containers, or other virtual partitions (i.e., virtual infrastructure), at which point the new service is in VI deployment stage 191. The requestor can specify characteristics (e.g., vCPU, memory, disk, etc.) associated with spinning up and managing virtual infrastructure. Lifecycle manager 180 can also perform one or more actions 192, which can include built-in actions (i.e., an action native to VNF manager 154A that can execute by default or user configuration) and/or custom actions (i.e., an action a user can predefine to override a default action or to execute in addition to a default action or other built-in action) when the virtual infrastructure comes online. In various examples, lifecycle manager 154A can perform any number of actions (e.g., built-in and/or custom actions), including no actions, in parallel and/or a specific order (e.g., one or more custom actions followed by or more built-in actions and/or other custom actions).

The one or more actions 192 can include a single action or multiple actions. Any of the single and/or multiple actions can be built-in or custom actions, and may be associated with one or more triggers and/or conditions, which can be unique to a respective action or shared among multiple actions. In the case of multiple actions, such actions can execute in parallel, sequence, random, or in any other order (or lack thereof). For example, in some configurations, multiple actions can execute in parallel, while in other configurations, the multiple actions can execute in a specific sequence or order. To illustrate, four actions may execute in a particular sequence where one action executes after another action (e.g., immediately upon completion, within a predetermined amount of time after completion, on a schedule, etc.) in a particular sequence until all four actions have completed execution or until an event stops execution (e.g., a failure).

In some cases, a preceding action can function as a trigger or precondition for a subsequent action in set of multiple actions. For example, completion of a preceding action can 1) trigger the subsequent action, 2) trigger a call or request to perform the subsequent action, 3) trigger a timer or countdown for executing the subsequent action, 4) trigger a precondition for executing the subsequent action, 5) satisfy the precondition for executing the subsequent action, etc. In other cases, multiple actions can include a subset of actions that execute in a particular sequence, order, schedule, etc., and one or more actions that can execute in parallel to each other and/or parallel to one or more of the subset of actions.

Configuration module 182 can apply "day-zero" configuration and/or perform other bootstrapping tasks 193 for a new VNF service. For example, VNF configuration module 182 can set up credentials, licensing, connectivity information (e.g., IP address, gateway), and/or other static parameters to make the new service available to the network.

After configuration and bootstrapping, the VNF service is in VNF deployment stage 194. VNF monitoring module 183 can track the health and performance of the VNF service in monitoring stage 195. For example, VNF manager 154A can interface with element managers (e.g., element managers 120) and evaluate metrics 196, such as built-in service and performance metrics (e.g., number of jobs, capacity, load bursts, job priorities, number of concurrent sessions, etc.). In some examples, VNF manager 154A can integrate with a VIM manager (e.g., VIM manager 156) to also monitor the health and performance of the VNF service and/or the VM(s), container(s), and/or virtual partition(s) in which the VNF service resides, including built-in metrics (e.g., CPU use, memory consumption, bandwidth, etc.) and user-defined metrics.

In various examples, VNF manager 154A can use agentless monitoring to track the health and performance of the VNF service and the virtual infrastructure running the VNF service. Agentless monitoring can reduce service deployment by eliminating or minimizing the time and resources otherwise necessary for integration of agents, re-validation/re-certification, root-cause troubleshooting (i.e., determining whether an issue is the VNF software or the orchestrator software), etc. With an agentless mode of monitoring operations, VNF manager 154A can monitor CPU or memory use to track VNF performance and/or other user-defined metrics based on other protocols (e.g., Simple Network Management Protocol (SNMP)) or custom scripts. VNF manager 154A can scale in/out/up/down for monitoring module 183. For example, VNF manager 154A can track the load of monitoring module 183 and scale in/out instances of monitoring module 183 to maintain a specified load for monitoring module 183. As another example, VNF manager 154A can track the load of monitoring module 183 and scale up/down resources to maintain the specified load for monitoring module.

Analytics engine 184 identifies problems and events that require action, and rules engine 185 defines rules and thresholds establishing the criteria for these occurrences. Together, these engines can automate and accelerate the response of VNF manager 154A to specific conditions or events. Analytics engine 184 and rule engine 185 can handle both simple and complex rules. For example, an administrator can define a simple rule such as advertising availability of a service to the rest of the network when the service goes live. A more complex rule can specify a set of actions to perform in response to a particular event, such as directing VNF manager 154A to automatically scale up/down or in/out, and notify the orchestrator when overloading or underloading of resources or instances (e.g., VNF instances, VNFM instances, engine instances, etc.) occurs.

In this example, analytics engine 184 can receive state information from monitoring module 183 to identify lifecycle stages such as VNF/VNFM overloading/underloading 192A (e.g., overloading/underloading of VNF 122, VNFM 154, and/or associated resources), virtual infrastructure 192B overloading/underloading (e.g., overloading/underloading of virtual infrastructure in which a VNF and/or VNFM runs), VNF/VNFM failure 192C (e.g., failure of a VNF or VNFM), virtual infrastructure failure 192D, etc. The analytics engine 184 can evaluate applicable rules and thresholds from rules engine 185 to trigger one or more actions 192, including built-in and/or custom actions for example. VNF manager 154A can support a variety of built-in lifecycle stages or custom lifecycle stages based on other built-in conditions or custom conditions that can invoke other built-in actions and/or custom actions subject to other built-in rules and thresholds and/or custom rules and thresholds. As previously explained, actions 192 can include a single action or multiple actions, and multiple actions can execute in various ways (e.g., parallel, sequence, hybrid, etc.).

Figure 2A:
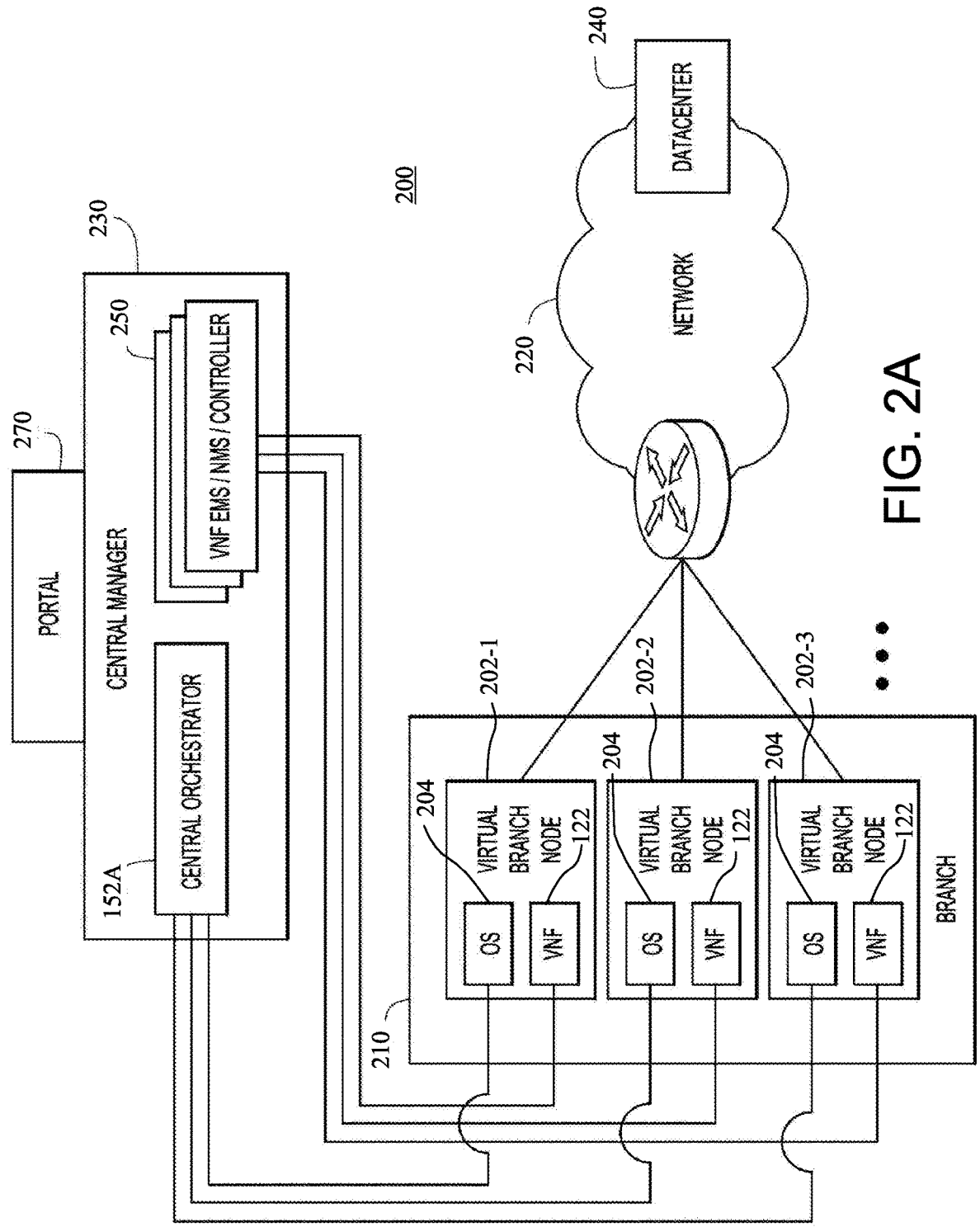
FIG. 2A illustrates a block diagram of an example virtual branch node architecture.

FIG. 2A illustrates an example vBranch system 200 having an NFV platform. In this example, traditional routers and physical appliances are replaced with a hardware (e.g., x86) platform that supports VNFs and virtual networks. For branch virtualization, the local orchestrator and the virtual appliances are managed by a central orchestration subsystem. The system includes a plurality of vBranch nodes 202-1 through 202-N at a branch 210. The plurality of vBranch nodes 202-1 through 202-N have connectivity (e.g., IP connectivity) to a network 220 and a central manager 230. The central manager 230 can be an example of NFV MANO 150 shown in FIG. 1A, and/or can implement one or more components from NFV MANO 150.

While FIG. 2A shows N vBranch nodes, there may be one or more vBranch nodes at a branch. A datacenter 240 may also be connected to the network 220. There may be multiple (potentially thousands of) branches 210, but for simplicity, in FIG. 2A only a single branch is shown. Each vBranch node includes at least one VNF shown at reference numeral 122 and an operating system (OS) shown at reference numeral 204.

Examples of virtual networking functions that may run on a vBranch node include a cloud service router (CSR), adaptive security appliance (ASA), web security appliance (WSA), wide area application services (WAAS), and other networking functions. CSR is a software router that is deployed as a virtual machine (VM) in a vBranch node using Linux KVM virtualization infrastructure. It supports comprehensive networking and security functions. ASA is a software firewall that is deployed as a VM in a vBranch node using Linux KVM virtualization infrastructure. It supports security features consistent with hardware-based appliance. WSA is a software web security appliance that is deployed as a VM in a vBranch node using Linux KVM virtualization infrastructure. It supports security features consistent with hardware-based WSA.

The central manager 230 may integrate functions of a central orchestrator 152A and a VNF Network Management System/Element Management System (NMS/EMS) controller 250. VNF NMS/EMS controller 250 can be an example of VNF Manager 154 and/or VI Manager 156 as shown in FIG. 1A or may include one or more components from VNF Manager 154 and/or VI Manager 156. A portal 270 is provided that enables user/administrator access to the central manager 230. In some implementations, the central orchestrator 152A and the VNF EMS/NMS controller 250 are combined into one entity.

The system 200 supports a large number of branch locations (e.g., hundreds, thousands, etc.,) with a number of VNFs (for example, 8 VNFs) at each branch. In some cases, these VNFs can run as virtual machines on a kernel-based virtual machine (KVM). However, in other examples, the architecture may support other hypervisors and containers technology without requiring upgrades of the NFV orchestrator 152A.

The central orchestrator 152A is a central orchestration component responsible for the control and management of all vBranch nodes associated with a customer. It performs a number of functions. First, it provides a central repository where VNF software and service profiles models reside. The service profile model describes how VNFs should be deployed and connected when they are implemented on a vBranch node. Second, it maintains ongoing status of vBranch nodes. Third, the central orchestrator 152A on-boards, using zero touch provisioning techniques as described herein, new vBranch nodes into the system 200 when they are first deployed, and thereafter monitors the status of the vBranch nodes.

The portal 270 is a component that provides two portal functions. The first is the user portal function to allow an end-user to select, manage and perform very basic problem determination on VNFs and service profiles (a collection of VNFs chained together) at the branch level. In the case of a service provider-managed service environment, the end-user would be the network or IT administrator of the end-user customer. In the case of an enterprise environment, the end-user would be network or IT administrator depending on organization's setup. The second function is the operator portal function. This provides an interface to define and onboard new VNFs and new service profiles model, perform problem determination and to gather analytical information associated with the VNF infrastructure for one or more vBranch nodes. In a service provider-managed service environment, this may be an individual from the service provider. In enterprise environments, this would be either second line IT or network support depending on organizational setup.

While the virtual branch system 200 solves many problems associated with providing a rich and adaptable service infrastructure in the branch 210, it does present some challenges. For example, generally there is a hardware platform and its OS in the branch that needs to be managed and addressed through a wide area network (WAN) connection. The OS and particularly the local VNF manager component of the OS is important in managing the branch environment because it is the first component booted up in the branch and is responsible for orchestrating a virtual router in the branch. Therefore, it cannot be addressed through the router in the branch. It needs to be accessible in its own right through the WAN connection. The local VNF manager component in the virtual branch needs a logical local management network to the VNFs to enable local life management of those VNFs. The central orchestrator needs to be able to access the VNFs through the logical local management network for configuration purposes. This is typically through a WAN interface. WAN addressing is generally very constrained and every effort needs to be made to preserve these addresses. The addressing of the WAN interface is often under the control of the Service Provider. Moreover, it is important to ensure that the number of addresses or routes associated with the vBranch infrastructure does not increase significantly due to the act of virtualization. The disclosure herein addresses these and other challenges as described below with respect to FIGS. 2B through 6.

Additionally details regarding vBranches are further described in U.S. Patent Publication No. US20160359805A1 to Spraggs et al., filed on Jun. 3, 216, entitled "Addressing and managing an internal network of a virtual branch node", all of which is incorporated by explicit reference herein in its entirety.

Figure 2B:
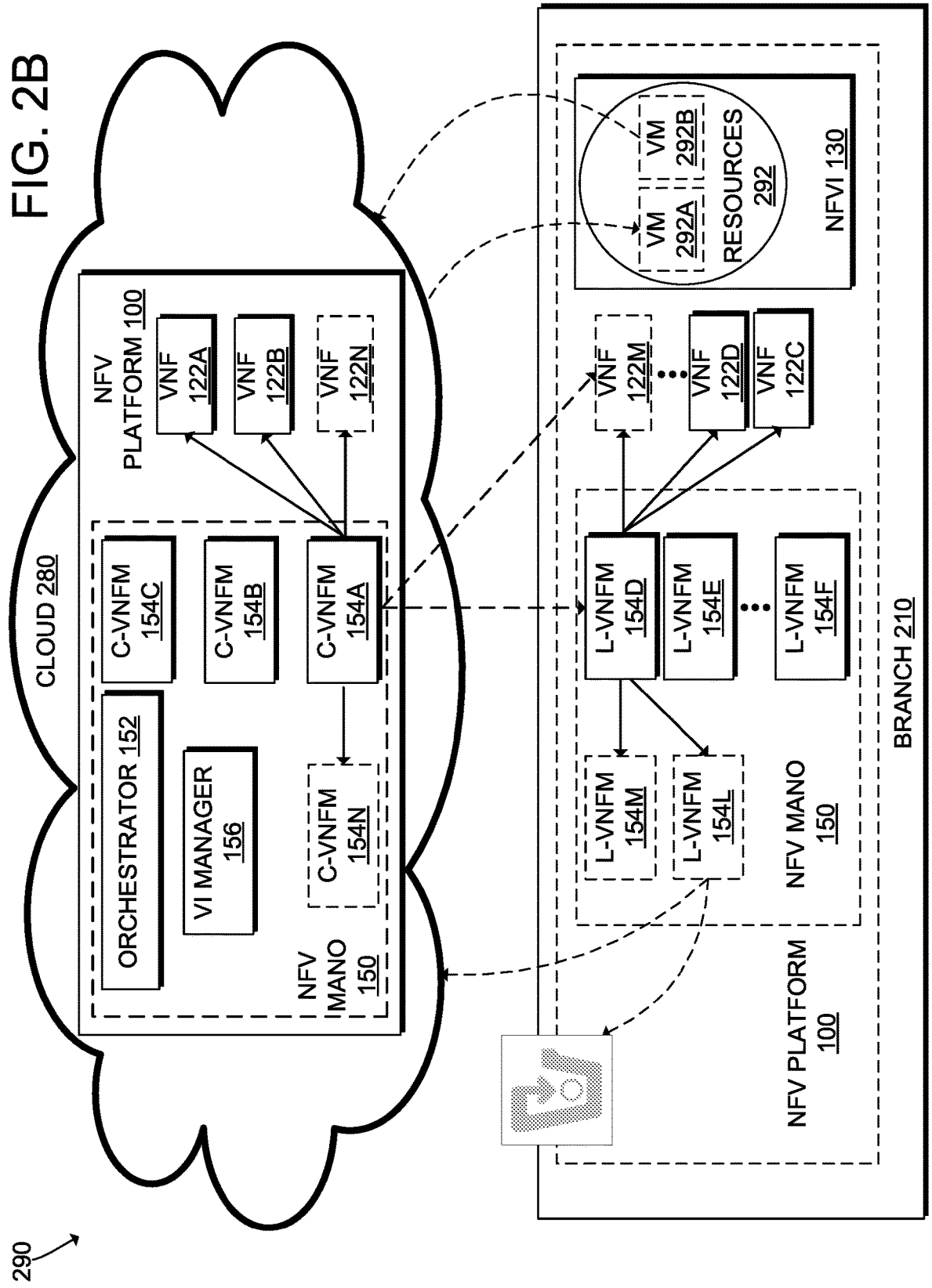
FIG. 2B illustrates an example of a hybrid network environment including a network function virtualization platform, a local network, and a remote network.

FIG. 2B illustrates a block diagram of an example hybrid network environment 290 implementing NFV platform 100 on a cloud 280 and a branch 210 (e.g., vBranch system 200). In this example, the cloud 280 represents one or more remote networks and the branch 210 represents one or more local networks. The cloud 280 and branch 210 are shown in this example for clarity and explanation purposes to illustrate a hybrid network environment including a local and remote network. However, it should be understood that the hybrid network environment 290 can include any type and number of remote and local networks, such as a local area network (LAN), a private cloud, a public cloud, a hybrid cloud, one or more datacenters, an enterprise network, a campus network, etc.

The cloud 280 and branch 210 can run a respective NFV platform, such as NFC platform 100. The cloud 280 and branch 210 can communicate with each other and share resources, services, workloads, etc. For example, the cloud 280 and branch 210 can work together to service a workload by hosting respective portions of the resources or services for the workload, load balancing portions of the workload, load balancing and/or sharing management (e.g., monitoring, orchestration, etc.) tasks for the workload, scaling in/out resources and instances between the cloud 280 and branch 210, providing backup or recovery for the workload, etc. Specific components of the NFV platform on the cloud 280 and branch 210 can communicate and interact with each other to coordinate tasks, resources, instances, workloads, etc. For example, one or more cloud VNFMs or C-VNFMs (C-VNFM 154A-C) and local VNFMs or L-VNFMs (L-VNFM 154D-F) can interact with each other to scale in/out VNFs (e.g., VNFs 122A-D), VNFMs (e.g., C-VNFMs 154A-C and L-VNFMs 154D-F), and/or resources (e.g., physical and/or virtual infrastructure) on the cloud 280 and/or the branch 210.

In some cases, one or more specific VNFMs on the cloud 280 and/or the branch 210 can monitor VNFMs, VNFs, resources, networks, etc., and determine whether scaling operations should be performed. For example, in some cases, C-VNFM 154A on the cloud 280 can monitor itself, C-VNFMs 154-B-C on the cloud 280, L-VNFMs 154D-F on the branch 210, VNFs A-B on the cloud 280, VNFs C-D on the branch 210, resources on the hybrid environment 290 (e.g., the cloud 280 and/or branch 210), status or conditions on the hybrid environment 290 (e.g., the cloud 280 and/or branch 210), workloads on the hybrid environment 290 (e.g., the cloud 280 and/or branch 210), etc. Based on the monitoring, C-VNFM 154A can determine if any of the services (e.g., VNFs, VNFMs, etc.) or resources are overloaded/underloaded, and make scaling decisions for the services or resources to maintain a specific load, performance, balance, ratio, capacity, redundancy, etc., for specific services, resources, networks, etc.

To illustrate, C-VNFM 154A can determine if any of L-VNFMs 154D-F are overloaded/underloaded, the branch 210 is overloaded/underloaded, the C-VNFM 154A itself is overloaded, etc. If an L-VNFM is overloaded, the C-VNFM 154A can scale out the L-VNFM by adding one or more L-VNFM instances on the branch 210, such as L-VNFM 154M. If the branch 210 (e.g., the branch network and/or its resources) is overloaded, the C-VNFM 154A can move VNFs, such as VNF C or VNF D, from the branch 210 to the cloud 280, and/or add one or more resources (e.g., VMs, containers, virtual compute, virtual storage, virtual network, etc.), such as VM 292A, to the resources 292 on the branch 210. If the C-VNFM 154A itself is overloaded, the C-VNFM 154A can add one or more instances of C-VNFM 154A, such as C-VNFM 154N, to scale itself out.

On the other hand, if an L-VNFM is underloaded, the C-VNFM 154A can scale in the L-VNFM. For example, the C-VNFM 154A can remove, migrate, disable, etc., one or more instances of the L-VNFM on the branch 210, such as L-VNFM 154L. By scaling in the L-VNFM, the C-VNFM 154A can balance the load for the L-VNFM(s) and the branch 210. If the C-VNFM 154A is underloaded, the C-VNFM 154A can similarly scale itself in. For example, the C-VNFM 154A can remove, migrate, disable, etc., one or more instances of the C-VNFM 154A.

In some cases, the C-VNFM 154A can monitor the L-VNFMs on the branch 210, the VNFs 122 on the branch 210, the resources 292, the branch 210, etc., through one or more L-VNFMs, and scale in/out VNFs, VNFMs, and/or resources 292 on the branch through the one or more L-VNFMs. For example, the C-VNFM 154A communicate with L-VNFM 154D to collect monitoring data, such as load information, performance statistics, metrics, VNF information, VNFM information, service requirements, etc., and determine if the C-VNFM 154A should scale in/out any resources, VNFs, VNFMs, etc., on the branch 210. If the C-VNFM 154A determines a specific resource or service should be scaled in/out based on the monitoring data, the C-VNFM 154A can send a request or instructions to the L-VNFM 154D to scale in/out the resource or service accordingly. The request or instructions from the C-VNFM 154A can include specific parameters, configurations, conditions, etc., to facilitate the scaling of the resource or service.

Figure 2C:
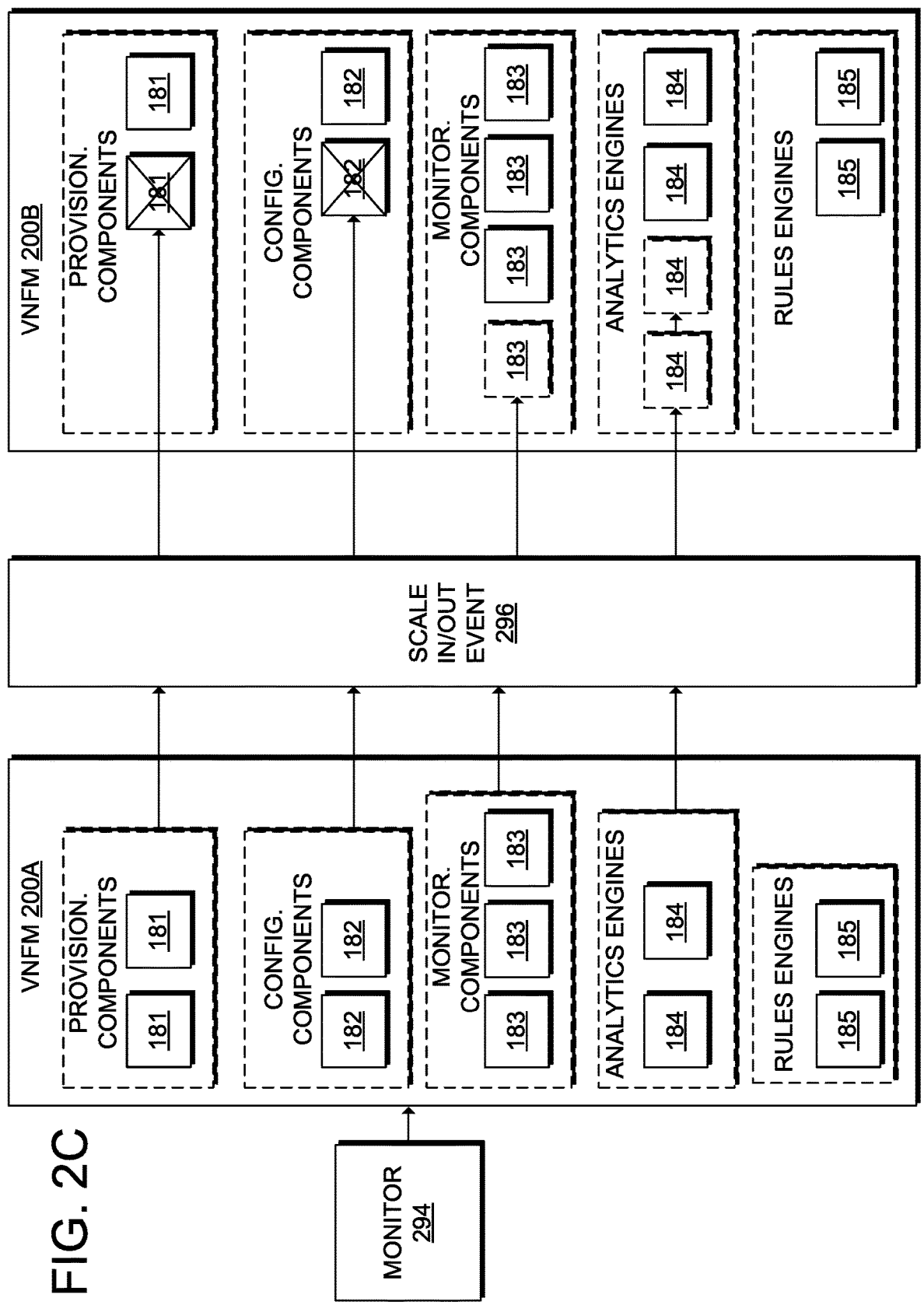
FIG. 2C illustrates an example system for scaling components of a VNFM.

FIG. 2C illustrates an example system for scaling components of a VNFM such as C-VNFM 154A. The VNFM can scale individual components, such as components 181-185, in or out based on load status. For example, the VNFM can scale components 181, 182, 183, 184, and/or 185 to handle additional VNFs, VNFMs, and/or lifecycle events. In this example, VNFM 200A represents an example VNFM prior to scaling and VNFM 200B represents the VNFM after one or more scaling of components in VNFM 200A.

VNFM 200A can monitor 294 components 181-185 as well as load status as previously mentioned. Based on the load status, VNFM 200A can perform a scaling event 296 to add or remove components 181-185. In this example, VNFM 200A performs a scaling event 296 to remove a provision component 181 and a configuration component 182, and add a monitoring component 183 and two analytics engines 184. VNFM 200B illustrates VNFM 200A after the scaling event 296.

The addition and removal of components can allow the VNFM to adjust to load demands. The VNFM can continue to monitor 294 components 181-185 and performing scaling events 296 to adjust as load demands change. The specific scaling event 296 can add or remove components 181-185 according to specific needs and/or load conditions. For example, the VNFM can scale specific components depending on whether the VNFM needs to increase/decrease monitoring operations, deployment operations, etc.

Figure 3:
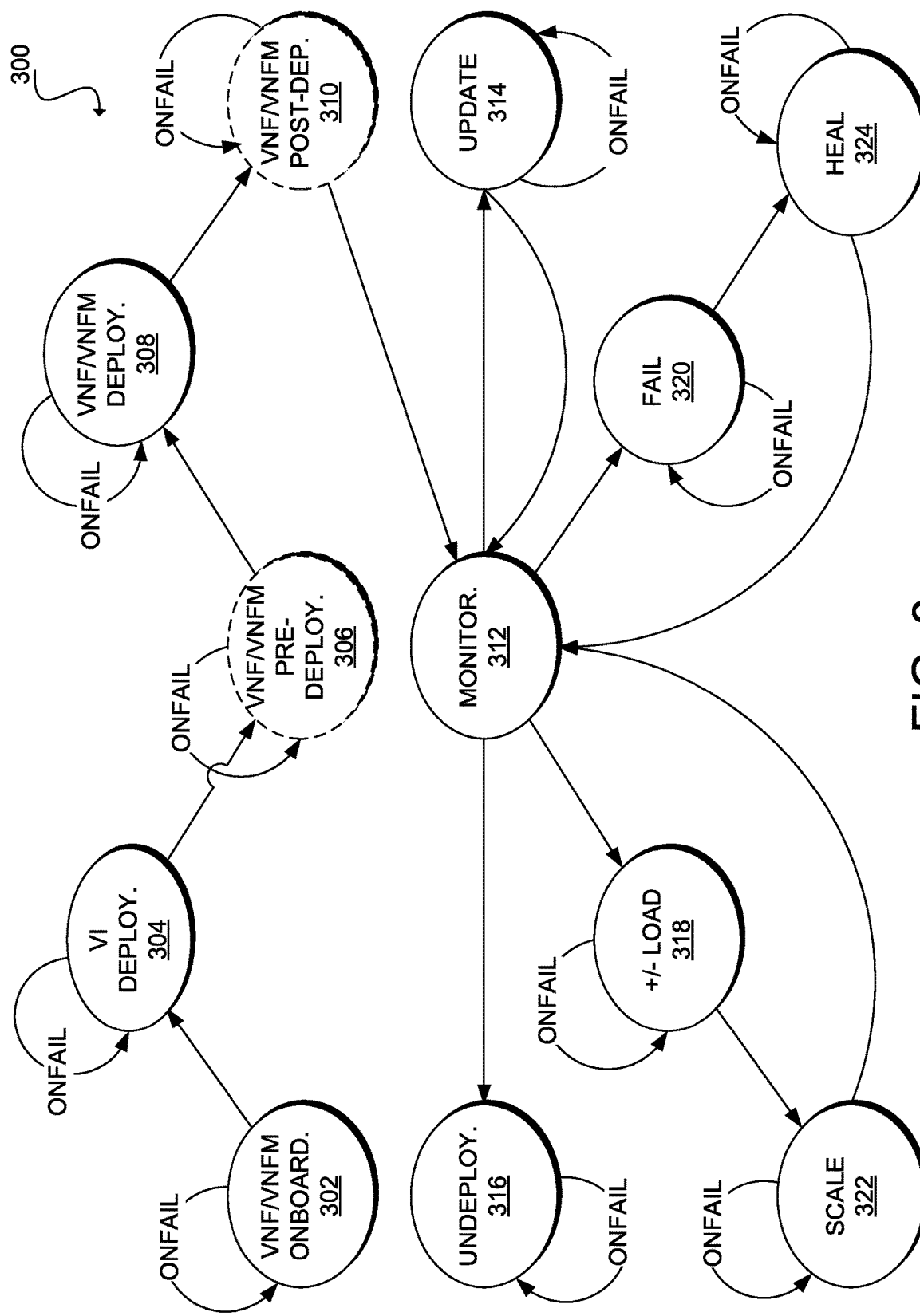
FIG. 3 illustrates an example of a lifecycle state machine for a VNF or VNFM.

FIG. 3 illustrates an example lifecycle state machine 300 for a VNF or VNFM and its associated VM(s), container(s), and/or other virtual partition(s). A VNF manager (e.g., VNF manager 154, VNF manager 154A, C-VNFM 154, etc.), and more specifically a lifecycle manager (e.g., lifecycle manager 180) can track the health, load, performance, status, etc., of a VNF or VNFM and its underlying virtual infrastructure in accordance with lifecycle state machine 300. In this example, lifecycle state machine 300 includes VNF/VNFM onboarding stage 302, VI deployment stage 304, VNF/VNFM pre-deployment stage 306, VNF/VNFM deployment stage 308, VNF/VNFM post-deployment stage 310, monitoring stage 312, update stage 314, undeployment stage 316, overderloaded/underloaded stage 318, fail stage 320, scale stage 322, and heal stage 324. In various examples, a lifecycle state machine can include any number of built-in lifecycle stages and/or custom lifecycle stages and lifecycle state machine 300 is but one possible set of lifecycle stages.

One or more of the lifecycle stages of lifecycle state machine 300 can exhibit similar behavior—generally staying in the same stage on failure and transitioning to a new stage on success. The VNF manager can re-attempt one or more actions associated with a particular lifecycle stage until the action(s) complete(s) successfully. VNF/VNFM onboarding stage 302, VI deployment stage 304, VNF/VNFM pre-deployment stage 306, VNF/VNFM deployment stage 308, VNF/VNFM post-deployment stage 310, updating stage 314, overloaded/underloaded stage 318, fail stage 320, scale stage 322, and heal stage 324 can behave in this manner. VNF/VNFM onboarding stage 302 represents the first time the VNF manager adds a VNFM or VNF. This stage can involve ensuring that the VNF or VNFM complies with the prerequisites defined for the VNF or VNFM, such as one or more requirements provided by a VIM (e.g., VIM 156). Non-limiting examples of prerequisites or requirements can include support for certain virtual image formats (e.g., raw image format, Open Virtualization Format (ovf), QEMU copy on write (qcow) or qcow2, virtual machine disk (vmdk), etc.), a configuration drive for VNF or VNFM boostrapping, or templates for new VNF or VNFM types.

VI deployment stage 304 can occur after a request to the VNF manager for a VNF or VNFM, upon which the VNF manager can provision the virtual resources for the VNF or VNFM. The deployment of the VNF or VNFM can include one or more phases, such as VNF/VNFM pre-deployment stage 306, VNF/VNFM deployment stage 308, and VNF/VNFM post-deployment stage 310. In VNF/VNFM deployment stage 308, the VNF manager applies configurations (e.g., day zero configuration, mirrored configuration, etc.) for the VNF or VNFM, such as credentials, licensing, connectivity information (e.g., IP address, gateway, etc.), and/or other parameters to make the virtual resource available to the system. The VNF manager can also activate licenses for the new VNFs or VNFMs during VNF/VNFM deployment stage 308. In this example, VNF/VNFM pre-deployment stage 306 and VNF/VNFM post-deployment stage 310 are lifecycle stages preceding and following VNF/VNFM deployment stage 308, respectively.

VNF/VNFM pre-deployment stage 306, VNF/VNFM deployment stage 308 and VNF/VNFM post-deployment stage 310 (and any other lifecycle stages) can be custom lifecycle stages and/or built-in or native lifecycle stages. In various examples, an administrator can define a lifecycle stage, such as a custom lifecycle stage, by configuring the VNF manager, an analytics engine (e.g., analytics engine 184), and/or rules engine (e.g., rule engine 185) to perform one or more specific tasks upon the occurrence of one or more conditions.

Other lifecycle state machines may exhibit different or additional behavior, such as more complex behavior, which can include additional lifecycle stages and can provide, for example, more robust error handling, rolling back failed actions, transitioning to particular stages to resolve identified issues, etc. For example, in monitoring stage 312, the VNF manager can track the health of virtual infrastructure using various methodologies, such as Internet Control Message Protocol (ICMP), ping, SNMP, event logging, status monitoring, etc. The VNF manager can also monitor performance metrics, such as CPU use, memory consumption, IOPS, number of active jobs, latency, and other parameters. The VNF manager can also provide a framework to monitor service and/or performance-related metrics as well as other user-defined parameters (e.g., capacity, load bursts, number of concurrent sessions, priorities, patterns, etc.).

In overloaded/underloaded stage 318, the VNF manager can detect load conditions (e.g., amount of workload, maximum capacity, resource availability, service requirements, etc.) of the VNF or VNFM and/or the virtual infrastructure. This can trigger one or more scaling actions and entry into scale stage 322 to increase VNFs, VNFMs, virtual resources, etc., in the overloaded stage; and decrease VNFs, VNFMs, virtual resources, etc., in the underloaded stage. In fail stage 320, the VNF manager can detect failure conditions of the VNF or VNFM and/or the virtual infrastructure, and in heal stage 324, the VNF manager can invoke one or more healing actions for handling the failure conditions. In some examples, the VNF manager can utilize an analytics engine (e.g., analytics engine 184) to evaluate built-in or native key performance indicators (KPI) and/or custom metrics to define overloaded/underloaded stage 318, fail stage 320, and any other scenarios related to the VNF or VNFM and its underlying virtual infrastructure. The VNF manager can take specific actions defined in a rules engine (e.g., rules engine 185).

In some examples, the VNF manager allows deployment updates after a successful deployment. In update stage 314, the VNF manager can perform updates (e.g., adding or deleting a virtual infrastructure group, adding or deleting an ephemeral network in a virtual infrastructure group, adding or deleting an interface in a virtual infrastructure group, etc.). In some cases, the VNF manager can perform updates in a single deployment or individually.

The VNF manager can also support undeployment of a deployed VNF or VNFM. In undeployment stage 316, the VNF manager can undeploy the VNF or VNFM in response to one or more events, such as a request from a northbound API (e.g., NETCONF API 202, REST API 171) or another interface (e.g., web GUI 172), a load condition (e.g., an underloaded status), a failure condition, etc.

The VNF manager can dynamically alter the behavior of a running or live VNF or VNFM or adapt to load conditions of the network and/or the VNF or VNFM. In some cases, the VNF manager can do so without undeploying the VNF or VNFM or its underlying virtual structure by defining actions and conditions and/or updating existing actions and conditions and updating one or more database volumes associated with the VNF or VNFM or its underlying virtual infrastructure. In some cases, this can involve replicating the current database volume(s) of the VNF or VNFM or its underlying infrastructure, updating the replicated database(s) with the new and/or updated actions and conditions, detaching the current database volume(s), and attaching the updated database volume(s). In other examples, this can involve writing the new and/or updated actions and conditions to the current database volume(s) using structured query language (SQL) or other relational database querying language, Open Database Connectivity (ODBC) or other object-relational mapping (ORM) system, or other suitable data access techniques.

Figure 4A:
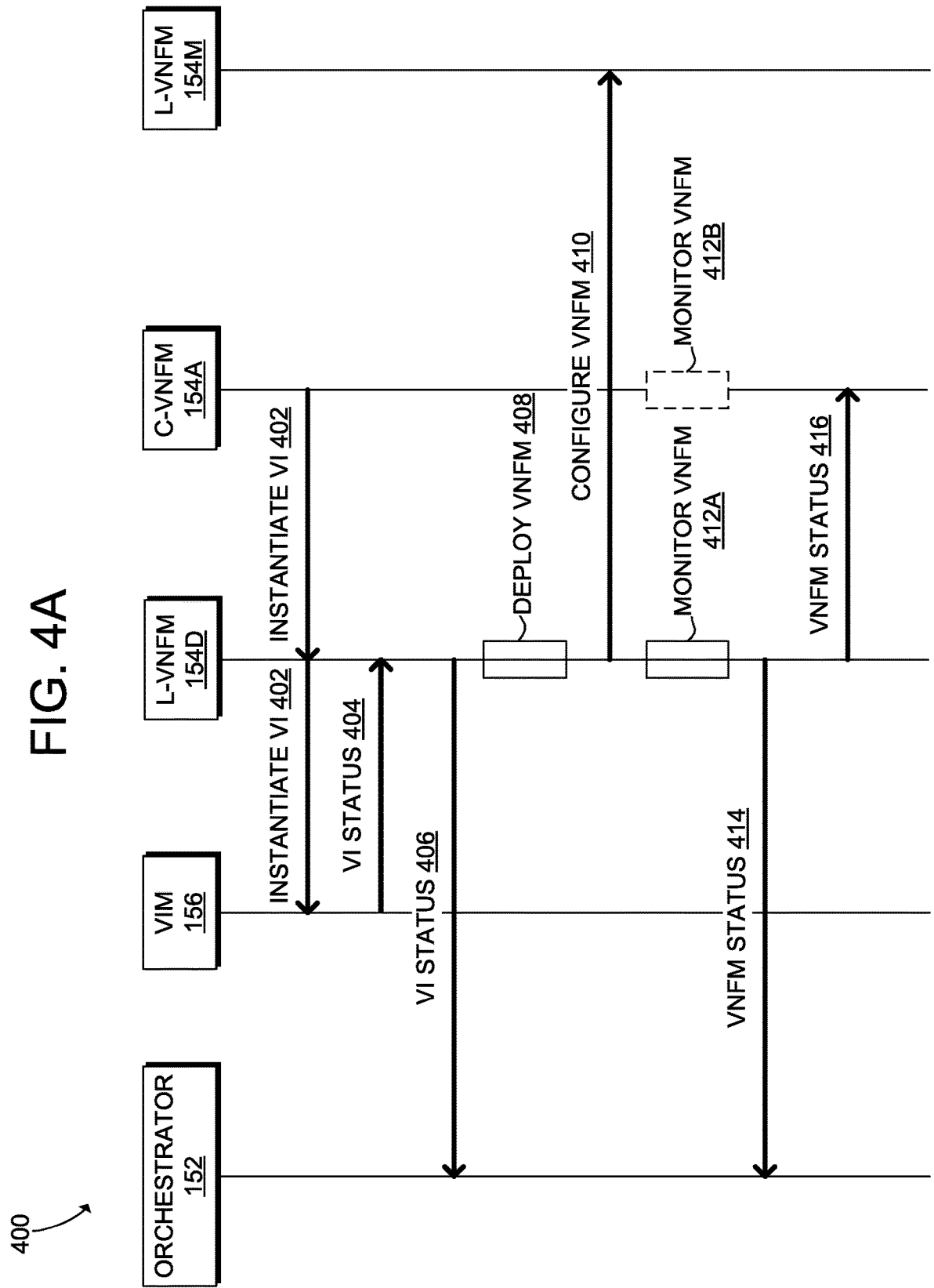
FIG. 4A illustrates a diagram of an example process for orchestration of a VNFM.
Figure 4B:
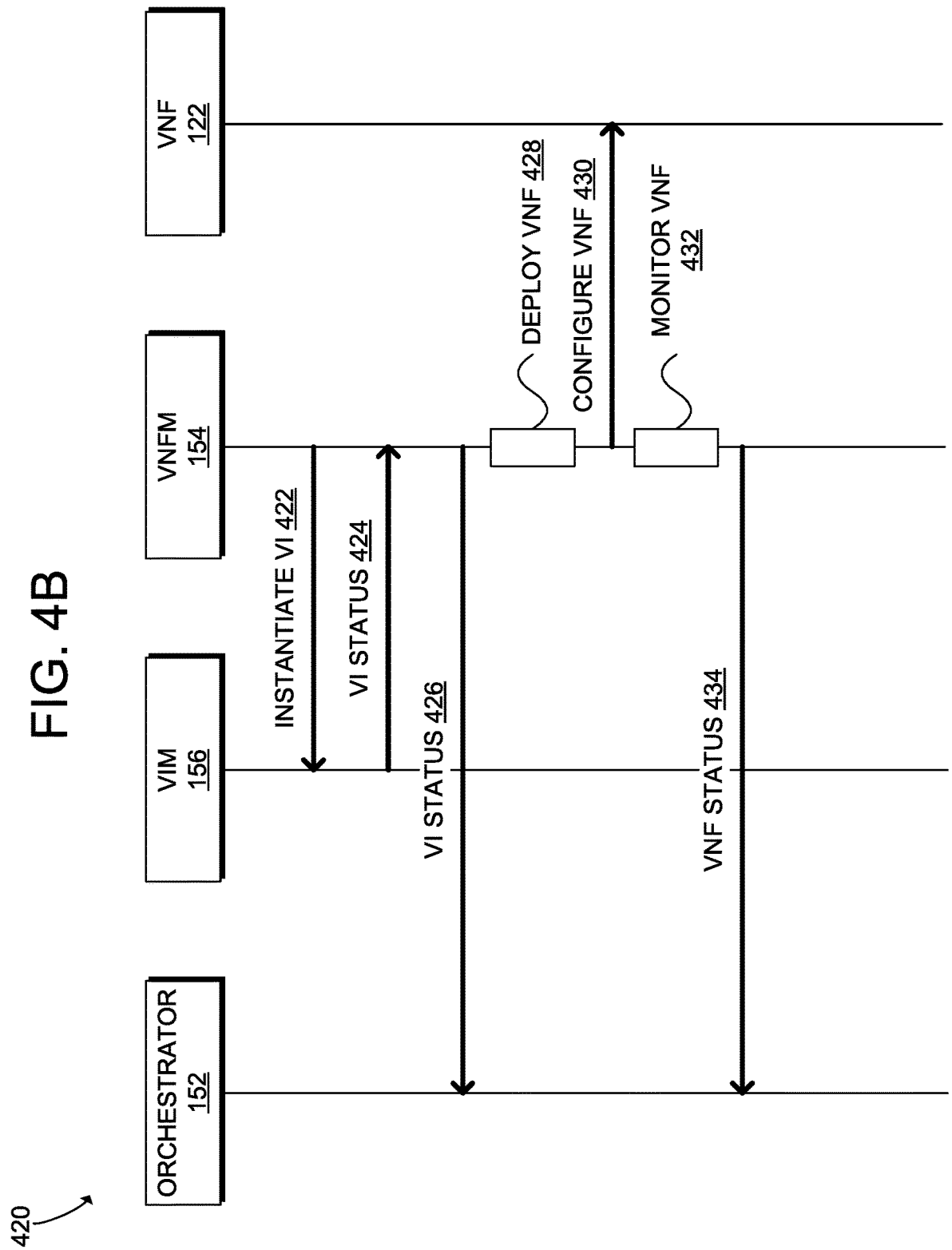
FIG. 4B illustrates a diagram of an example process for orchestration of a VNF.

FIG. 4A illustrates a diagram of an example process 400 for orchestration of a virtual service. The steps shown in example process 400 are non-limiting example steps provided for clarity and explanation purposes. However, in other examples, the process 400 can include additional, fewer, or alternative steps performed in similar or alternative orders.

The process 400 can occur within an NFV platform, such as NFV platform 100, including orchestrator 152, VNF managers 154, VIM 156, and VNF 122. In some examples, the process 400 can occur within a hybrid network environment, such as hybrid network environment 290. The virtual service can be, for example, a VNF (e.g., VNF 122), a VNFM (e.g., an instance of a VNF manager 154), etc. For clarity and explanation purposes, the process 400 in this example will be described with respect to the hybrid network environment 290 shown in FIG. 2B. In particular, VNF manager in this example will be C-VNFM 154A and the virtual service will be an instance of L-VNFM 154D. Moreover, L-VNFM 154M will be deployed using L-VNFM 154D as well as C-VNFM 154A.

Process 400 can begin with C-VNFM 154A detecting a condition triggering a deployment of L-VNFM 154M, such as an overloaded status of L-VNFM 154D. For example, the C-VNFM 154A can monitor a status of L-VNFM 154D (as well as other components in the branch 210 such as VNFs or resources), and making scaling decisions based on the status of L-VNFM 154D. When L-VNFM 154D is determined to be overloaded, the C-VNFM 154A can deploy L-VNFM 154M to decrease the load on L-VNFM 154D.

The C-VNFM 154A can initiate deployment of the L-VNFM 154M at step 422 by sending a request for VIM 156 on the branch 210 to instantiate a VI instance. The request can be transmitted through L-VNFM 154D. For example, the C-VNFM 154A can instruct L-VNFM 154D to send the request to VIM 156. However, in some configurations, the C-VNFM 154A can send the request directly to VIM 156.

The request to VIM 156 can include information (e.g., configurations, requirements, actions, parameters, descriptors, templates, scripts, etc.) for deploying L-VNFM 154M. For example, the request can specify one or more parameters (e.g., vCPU, memory, disk, etc.) associated with spinning up and managing virtual infrastructure. At step 424, VIM 156 can report the status of provisioning the VI instance to L-VNFM 154D and, at step 426, L-VNFM 154D can forward the status reported to orchestrator 152 on the branch 210. In some cases, VIM 156 can report the status of provisioning the VI instance to C-VNFM 154A and orchestrator 152 can receive a forwarded report of the status from C-VNFM 154A and/or L-VNFM 154D.

At step 428, L-VNFM 154D deploys L-VNFM 154M onto the instantiated VI instance. At step 430, the L-VNFM 154D can configure L-VNFM 154M according to one or more parameters or settings, requirements, conditions, etc. In some cases, the configuration can include applying "day-zero" configuration and/or performing other configuration (e.g., bootstrapping) tasks to condition the VI instance for L-VNFM 154M. For example, L-VNFM 154D can establish credentials, licensing, connectivity (e.g., IP address, gateway), and/or other parameters to make the instance of L-VNFM 154M available to the network (e.g., hybrid network environment 290).

The configurations can include mirroring configurations and/or data from L-VNFM 154D. Thus, the configurations from L-VNFM 154D can be used to deploy L-VNFM 154M as a mirror, clone, and/or copy of L-VNFM 154D. The configurations and configuration tasks for a service (e.g., VNF, VNFM, etc.) can be based on the configurations and configuration tasks of another service, the parent service, when migrating, cloning, mirroring, or copying the parent service to a new location and/or virtual infrastructure.

At step 432A, L-VNFM 154D can monitor the state of L-VNFM 154M during the deployment. At step 412B, C-VNFM 154A can also monitor the state of L-VNFM 154M during the deployment. In some cases, process 400 can involve either step 412A or step 412B. However, in some cases, the process 400 can involve both steps 412A and 412B. For example, in some configurations, L-VNFM 154D can monitor the state of L-VNFM 154M during the deployment, and C-VNFM 154A can optionally monitor the state during the deployment. In other configurations, both L-VNFM 154D and C-VNFM 154A can monitor the state of L-VNFM 154M during the deployment. Other variations can also be implemented. For example, in some configurations, L-VNFM 154D can monitor the state of L-VNFM 154M during the deployment and C-VNFM 154A can monitor the state before, during, and/or after the deployment.

At step 434, L-VNFM 154D can send a status of L-VNFM 154M to orchestrator 152. The status can include the deployment status of L-VNFM 154M, such as a deployment stage, a deployment state, a deployment completion, a deployment verification, a deployment log, a deployment error, deployment statistics, etc. At step 416, L-VNFM 154D can also report the status of L-VNFM 154M to C-VNFM 154A. In some cases, L-VNFM 154D can continue to report the status of L-VNFM 154M to C-VNFM 154A throughout the lifetime, or a period of the lifetime, of L-VNFM 154M.

Steps 422-432 can repeat for each VI instance needed by the virtual service, L-VNFM 154M.

Figure 5A:
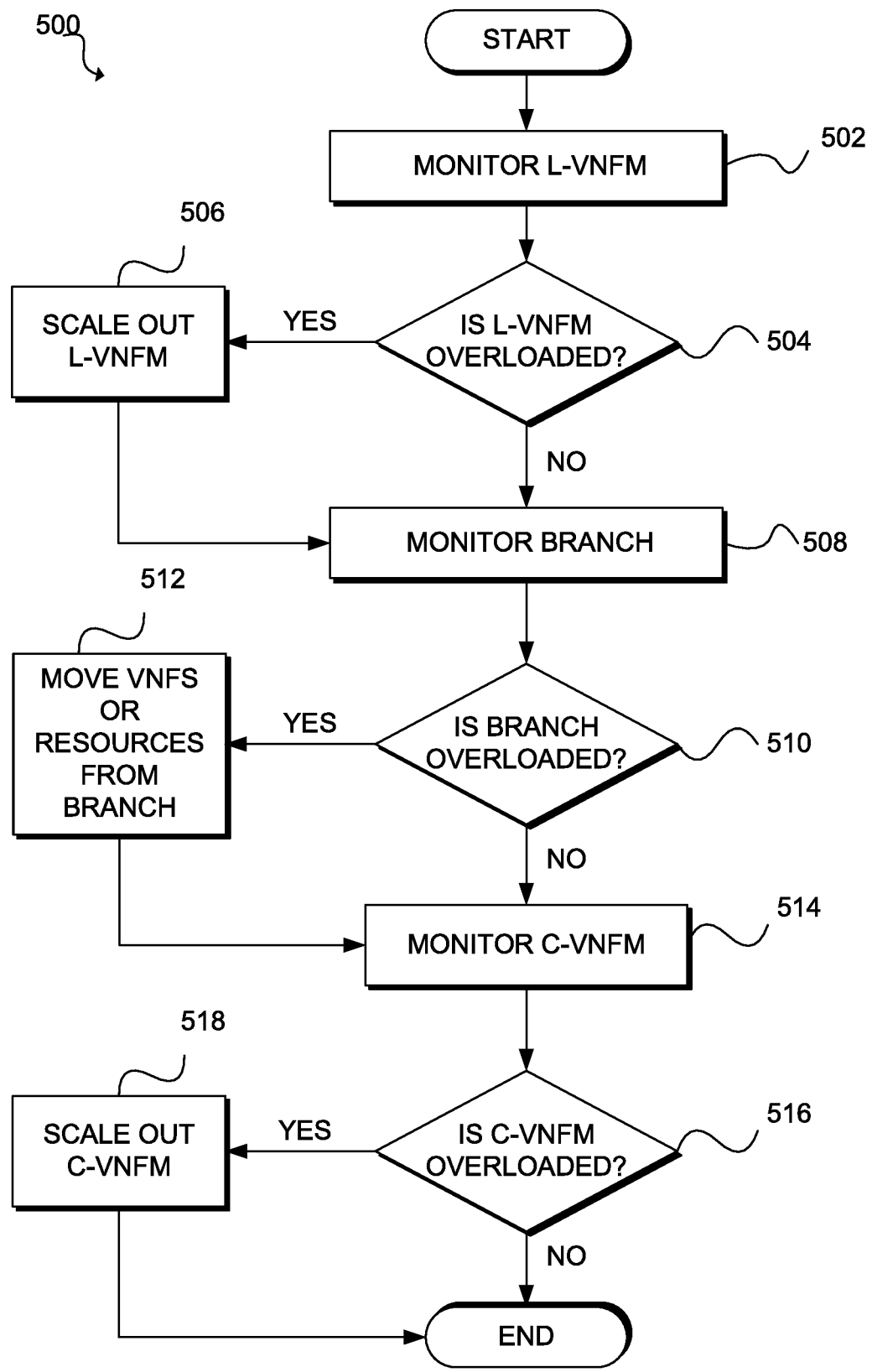
FIG. 5A illustrates a flowchart of an example method for scaling elements in an overloaded scenario.
Figure 5B:
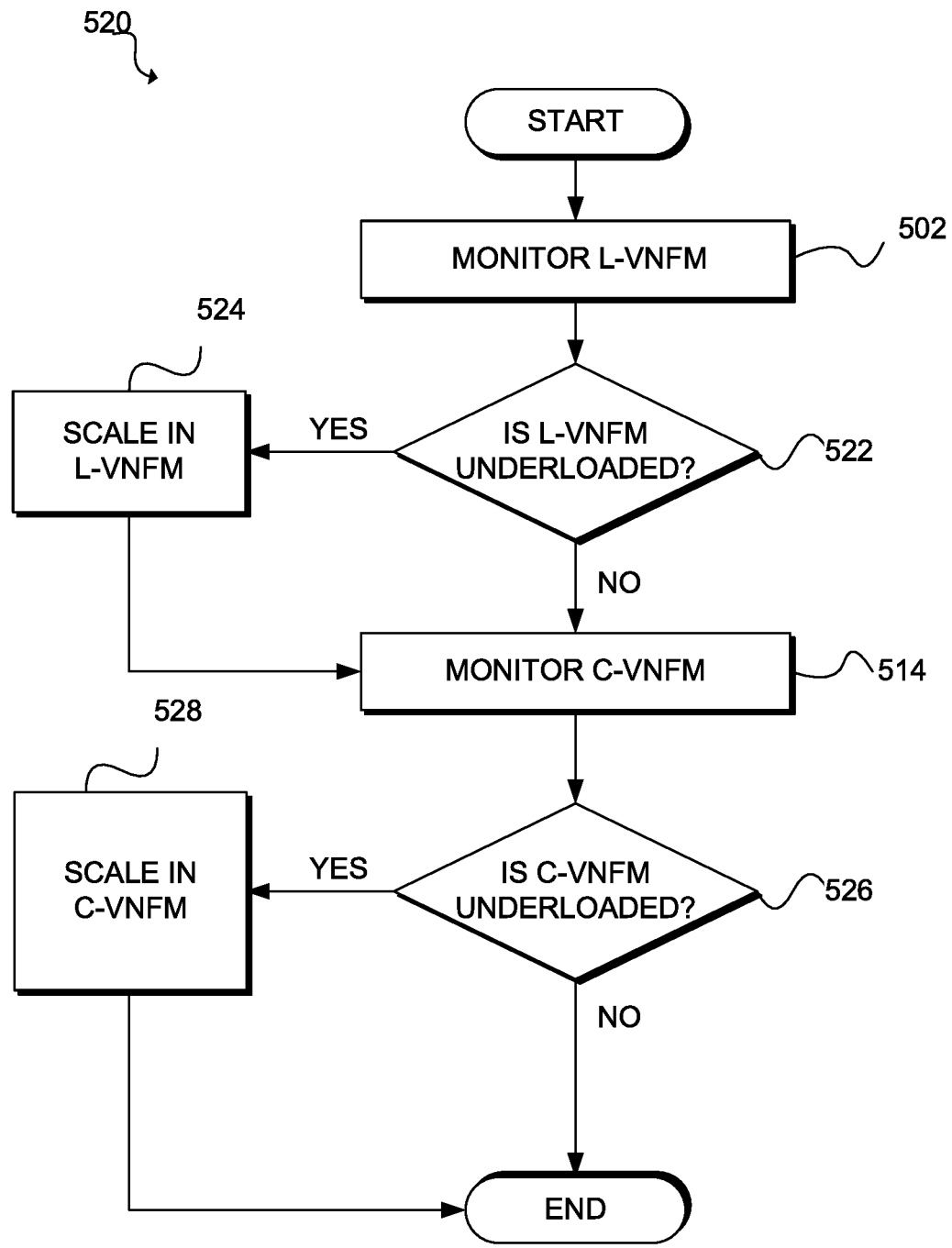
FIG. 5B illustrates a flowchart of an example method for scaling elements in an underloaded scenario.

The disclosure now turns to the example methods 500, 520 for hybrid, elastic scaling in overload and underload scenarios shown in FIGS. 5A and 5B. The steps outlined herein are examples and can be implemented in any combination thereof, including combinations that exclude, add, or modify certain steps.

The methods 500, 520 can occur within an NFV platform, such as NFV platform 100, including orchestrator 152, VNF managers 154, VIM 156, and VNF 122. Moreover, the methods 500, 520 can occur within a hybrid network environment hosting one or more NFV platforms, such as hybrid network environment 290. For the sake of clarity and explanation, the methods 500, 520 are described with reference to the hybrid network environment 290, including C-VNFMs 154, L-VNFMs 154, VNFs 122, resources 292, branch 210, and cloud 280, as shown in FIG. 2B. More specifically, the methods 500, 520 will be described with reference to C-VNFM 154A and L-VNFM 154D configured to perform the various steps in the methods.

FIG. 5A illustrates a flowchart of an example method 500 for hybrid, elastic scaling in overload scenarios. In this example, at step 502, C-VNFM 154A monitors L-VNFM 154D to determine a load status of L-VNFM 154D. The load status can be based on one or more load metrics or factors, such as one or more conditions, parameters, events, requirements, statistics, metrics, etc. For example, the load status can be monitored by analyzing load metrics, which can include statistics, status information, job information, configuration information, service requirements, capabilities, performance information, job priorities, resource capabilities, resource statistics, number of services, overall workload, etc., associated with L-VNFM 154D.

C-VNFM 154A can communicate with L-VNFM 154D and/or the branch 210 to collect information, such as load metric, for determining the load status of L-VNFM 154D. C-VNFM 154A can obtain such information through a push and/or pull model. For example, C-VNFM 154A can request (i.e., pull model) such information from L-VNFM 154D and/or the branch 210, and/or L-VNFM 154D or branch 210 (e.g., a device, such as a controller, at branch 210) can report (i.e., push model) such information to C-VNFM 154A.

Such information can be pushed or pulled at specific intervals (e.g., every n minutes, hours, or days; etc.) and/or triggering events. Non-limiting examples of a triggering event for pushing or pulling such information include a change in a load, status, or performance; a performance or load reaching a threshold; occurrence of a service event (e.g., service deployment, service modification, service request, etc.); a change in the number of VNFs on the branch 210; an indication that the number of VNFs on the branch 210 has reached or exceeded a threshold number of VNFs; a change in the amount or availability of resources 292 on the branch 210; an indication that the amount of available or active resources on the branch 210 have reached a threshold; an indication that a remaining capacity or availability of the L-VNFM 154D and/or the branch 210 is below a threshold; receipt of an information request, such as a user or system request for load and/or performance-related information; a condition has been satisfied; etc.

At step 504, C-VNFM 154A determines if L-VNFM 154D is overloaded based on the load status of L-VNFM 154D. C-VNFM 154A can determine if L-VNFM 154D is overloaded based on the load status of L-VNFM 154D. For example, C-VNFM 154A can determine L-VNFM 154D is overloaded when the load status reaches a threshold. The threshold can be defined for L-VNFM 154D based on one or more factors, such as a load of the L-VNFM 154D relative to a load capacity of the L-VNFM 154D, a performance of the L-VNFM 154D relative to a performance requirement for L-VNFM 154D and/or one or more services managed by L-VNFM 154D, a predefined maximum load, a load pattern associated with L-VNFM 154D and/or one or more services associated with L-VNFM 154D, a load capacity or resource availability associated with branch 210 and/or cloud 280, etc. In some cases, the threshold can be configured to be relative or proportional to the respective load status of the branch 210 and/or other services in the hybrid network environment 290, such as VNFs and/or VNFMs on the branch 210 and/or the cloud 280, or may vary based on their respective load status. For example, the threshold can depend on the respective load of other VNFMs on the branch 210.

To illustrate, the threshold can be set to remain within 5% of the highest load status of one or more other VNFMs, and/or may be set to a specific load level defined for L-VNFM 154D and configured to increase or decrease based on the respective load status of other VNFMs. For example, the threshold for L-VNFM 154D can be set to X amount of load but may also be configured to increase when the respective load status of N number (or all) of VNFMs reaches a Y amount of load or a Z percent of relative load. Thus, the threshold can be dynamic, adjustable, and/or dependent on more than one condition.

If C-VNFM 154A determines that L-VNFM 154D is not overloaded (e.g., L-VNFM 154D has not reached a threshold load status), the method 500 continues to step 508. On the other hand, if C-VNFM 154A determines that L-VNFM 154D is overloaded (e.g., L-VNFM 154D has reached a threshold load status), the method 500 continues to step 506. At step 506, C-VNFM 154A can scale out L-VNFM 154D. For example, C-VNFM 154A can initiate a deployment of one or more instances of L-VNFM 154D on the branch 210 and/or the cloud 280, and/or request additional resources (physical and/or virtual) from the branch 210, such as memory, compute, storage, etc. To illustrate, C-VNFM 154A can initiate a deployment of L-VNFM 154M on the branch 210 and/or deploy the one or more L-VNFMs as previously described with reference to process 400 shown in FIG. 4A.

The number of instances to deploy in response to L-VNFM 154D being overloaded can depend on one or more factors, such as the load status of L-VNFM 154D, the load status on the branch 210, the amount of resources 292 available on the branch 210, the service requirements associated with L-VNFM 154D and/or one or more VNFs associated with L-VNFM 154D, a number of VNFs associated with L-VNFM 154D and/or on the branch 210, a respective load status of the branch 210 and/or other VNFMs (e.g., L-VNFMs 154E, 154F), etc. For example, C-VNFM 154A can deploy a single instance of L-VNFM 154D if determined that a single instance is sufficient to balance the load associated with L-VNFM 154D, or multiple instances if more than one instance is necessary. The multiple instances can be deployed on the branch 210, the cloud 280, and/or a combination of the branch 210 and the cloud 280.

At step 508, C-VNFM 154A monitors the branch 210. C-VNFM 154A can monitor the branch 210 to determine if the branch 210 is overloaded. C-VNFM 154A can monitor the branch 210 based on load metrics associated with the branch 210, such as network parameters, network performance (e.g., delay, congestion, bandwidth, throughput, jitter, etc.), current network conditions or events (e.g., failures, errors, upgrades, network health, etc.), network and/or service requirements, network demands, network statistics or trends, resource statistics associated with resources 292 on the branch 210, cost parameters, quality of service parameters, network capabilities, etc. C-VNFM 154A can obtain load metrics based on a push and/or pull model as previously explained in step 502.

At step 510, C-VNFM 154A determines if the branch 210 is overloaded. C-VNFM 154A can determine an overloaded status based on the load metrics. The overloaded status can be determined when the load metrics reach or exceed a threshold defined for the branch 210. The threshold can be defined based on user preferences, a maximum load, service requirements, network trends, current conditions, a network history, service history, a cost, current and/or predicted demands, etc.

If C-VNFM 154A determines that the branch 210 is not overloaded, the method 500 continues to step 514. If C-VNFM 154A determines that the branch 210 is overloaded, the method 500 continues to step 512. At step 512, if the branch 210 is determined to be overloaded, C-VNFM 154A can move services (e.g., VNFMs, VNFs, etc.) and/or resources (e.g., VMs, containers, etc.) from the branch 210 to the cloud 280 and/or request additional resources (physical and/or virtual) from the cloud 280, such as memory, compute, storage, etc. For example, C-VNFM 154A can move or migrate VM 292B, VNF 122C, and/or L-VNFM 154L from the branch 210 to the cloud 280. C-VNFM 154A can move or migrate one or more services and/or resources, and the number of services and/or resources can depend on one or more factors, such as the load status of the branch 210, load patterns, capabilities of the branch 210, the number of services deployed and/or expected to be deployed, cost, etc.

At step 514, C-VNFM 154A can monitor itself and, at step 515, C-VNFM 154A can determine if it is overloaded. C-VNFM 154A can monitor its own load (e.g., number of services managed by C-VNFM 154A, the service or resource demands associated with C-VNFM 154A, memory usage associated with C-VNFM 154A, CPU usage associated with C-VNFM 154A, storage usage associated with C-VNFM 154A, etc.), its own capabilities, its own resource availabilities, its own usage patterns, its own requirements, etc., to determine if it is overloaded. The overloaded status can be determined based on an overload threshold, which can be based on one or more factors as previously explained, such as the load status, resource availability, predicted demands, capabilities, service requirements, relative load status of other services, etc.

If C-VNFM 154A determines that it is overloaded, at step 518, C-VNFM 154A can scale itself out. For example, C-VNFM 154A can deploy or initiate deployment of one or more instances of C-VNFM 154A on the cloud 280 and/or the branch 210. C-VNFM 154A can also request additional resources (physical and/or virtual) for its load. For example, C-VNFM 154A can request additional compute, memory, storage, and/or other resources, to meet its load demands and requirements.

FIG. 5B illustrates a flowchart of an example method 520 for hybrid, elastic scaling in underload scenarios. In this example, the method 520 begins by monitoring L-VNFM 154D to determine a load status of L-VNFM 154D, as previously explained in step 502 shown in FIG. 5A. At step 522, C-VNFM 154A determines if the L-VNFM 154D is underloaded. C-VNFM 154A can determine the underloaded status for L-VNFM 154D based on a load threshold as described in step 504. However, the load threshold for determining the underloaded status is lower than the load threshold for determining the overloaded status. For example, the load threshold for the underloaded status can be based on a minimum load for L-VNFM 154D, a minimum relative load associated with one or more VNFMs, a relative performance associated with one or more VNFMs, a performance of the L-VNFM 154D relative to performance requirements associated with L-VNFM 154D, etc.

If C-VNFM 154A determines that L-VNFM 154D is not underloaded, the method 520 proceeds to step 514, which was previously described with reference to FIG. 5A. If C-VNFM 154A determines that L-VNFM 154D is underloaded, the method 520 proceeds to step 524.

At step 524, if C-VNFM 154A determines that L-VNFM 154D is underloaded, C-VNFM 154A can scale in L-VNFM 154D. For example, C-VNFM 154A can remove instances of L-VNFM 154D, such as L-VNFM L; move instances of L-VNFM 154D to the cloud 280; pause instances of L-VNFM 154D; remove one or more components of L-VNFM 154D (e.g., subservices, subcomponents, resources, etc.); undeploy VNFMs associated with L-VNFM 154D; release resources used or associated with L-VNFM 154D and/or instances of L-VNFM 154D; migrate or deploy one or more resources to the branch 210 for use by L-VNFM 154D, such as VM 292A; manage additional services, such as VNFs; increasing the load of L-VNFM 154D; etc.

At step 514, C-VNFM 154A monitors itself as previously described with reference to FIG. 5A. At step 526, C-VNFM 154A determines if it is underloaded. C-VNFM 154A can determine if it is underloaded based on a threshold. The threshold can be based on the factors described at step 516 in FIG. 5A, but will be lower than the threshold used to determine an overload status. For example, the threshold for determining an underloaded status can be a minimum threshold, such as a minimum load, a minimum relative load, a specific performance relative to a service requirement, etc.

If C-VNFM 154A determines it is underloaded, at step 528, C-VNFM 154A can scale itself in. C-VNFM 154A can scale itself in by removing instances of itself, undeploying VNFMs associated with C-VNFM 154A, managing additional services (e.g., VNFs), removing components associated with C-VNFM 154A (e.g., subservices, etc.), releasing resources used by C-VNFM 154A, increasing its load, etc.

The VNFM life cycle management status and operations can have an effect on a VNFM's load and the load of the associated VNFs. Thus, when determining if a VNFM is underloaded or overloaded and/or whether a scaling operation is necessary in methods 500 and 520, C-VNFM 154A can take into account the VNFM lifecycle management status and operations taking place and/or scheduled to take place. For example, C-VNFM 154A can take into account the VNFM lifecycle management status and operations of L-VNFM 154D before deciding to scale in/out L-VNFM 154D. To illustrate, C-VNFM 154A may decide to stop or pause scaling L-VNFM 154D (or itself) in/out while L-VNFM 154D (or itself) is performing a scaling operation on an associated service (e.g., an associated VNF). Thus, C-VNFM 154A can factor in any interdependencies between a VNFM's virtual resource (e.g., VNFM VM) and the resources of its associated VNFs (e.g., VNF VMs).

Moreover, in addition to scaling in/out local VNFMs on the branch 210 (e.g., L-VNFMs), C-VNFM 154A can also scale in/out VNFs on the branch 210. C-VNFM 154A can scale in/out VNFs on the branch 210 based on a load status (e.g., overloaded, underloaded) of the VNFs on the branch 210 and/or the VNFMs on the branch 210. C-VNFM 154A can scale VNFs on the branch 210 directly and/or through one or more local VNFMs on the branch 210, such as L-VNFM 154D. C-VNFM 154A can thus remove some of the burden on the local VNFMs if they become overloaded.

When scaling in/out VNFMs and/or VNFs on the branch 210, C-VNFM 154A can perform such scaling operations (e.g., orchestration, instantiation, deployment, monitoring, etc.) through one or more local VNFMs, such as L-VNFM 154D. However, C-VNFM 154A can also perform such scaling operations directly and/or without (or with limited) coordination with the one or more local VNFMs. For example, C-VNFM 154A can directly monitor services on the branch 210 (e.g., VNFs, VNFMs, etc.) and/or communicate with the NFV components in the NFV platform on the branch 210 to perform such scaling operations.

Figure 6:
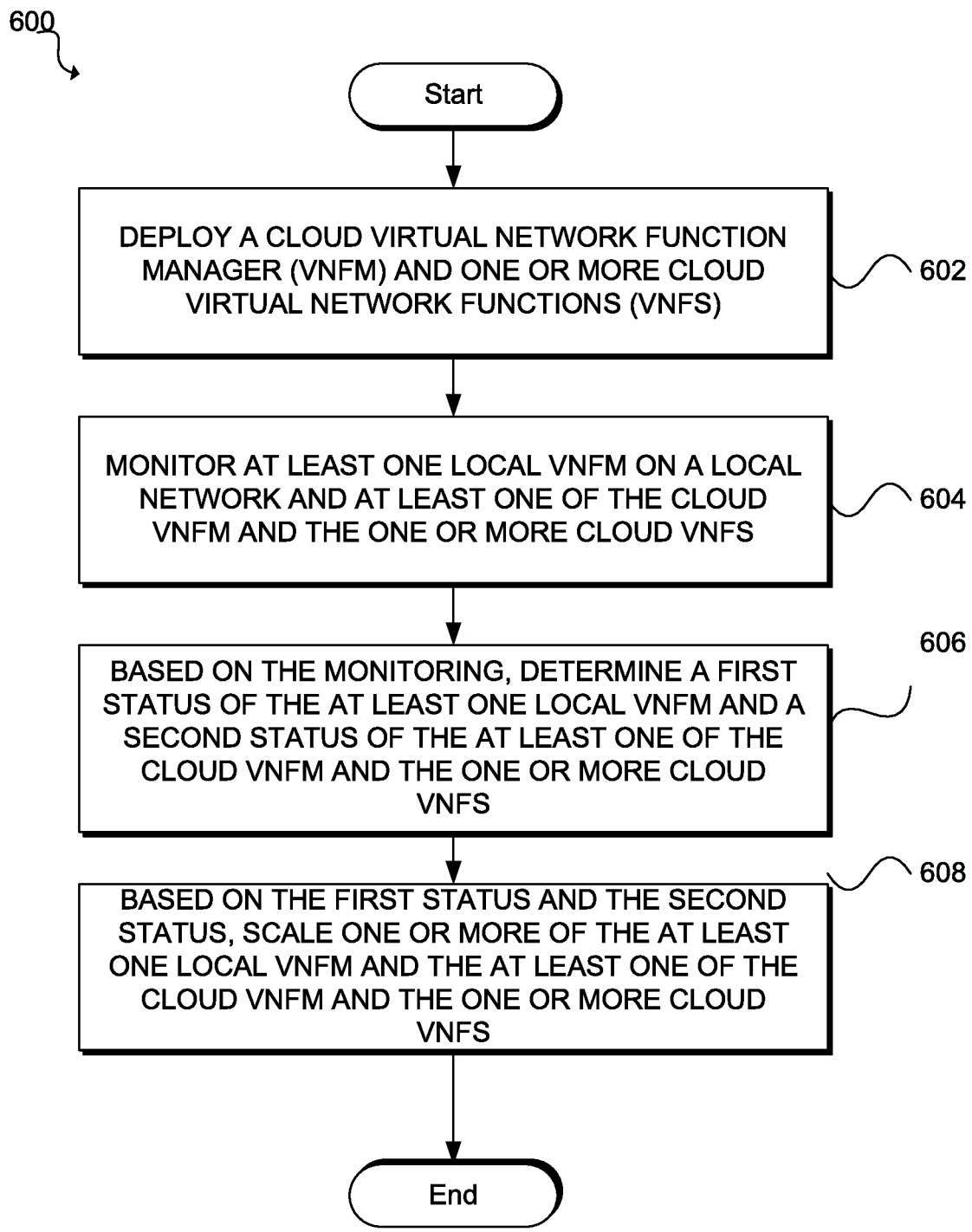
FIG. 6 illustrates an example method for hybrid, elastic scaling in a hybrid network environment.

FIG. 6 illustrates an example method 600 for hybrid, elastic scaling. The steps outlined herein are examples and can be implemented in any combination thereof, including combinations that exclude, add, or modify certain steps.

At step 602, the method 600 can involve deploying a cloud virtual network function manager (e.g., C-VNFM 154A) and one or more cloud virtual network functions (e.g., VNFs 122A-B). For example, NFV platform 100 on the cloud 280 can deploy C-VNFM 154A and VNF 122A-B on the cloud 280. NFV platform 100 on the cloud 280 can also deploy additional cloud VNFMs and/or services, such as C-VNFM 154B-C. In some cases, the method 600 can also involve deploying local VNFMs and/or local VNFs, such as L-VNFMs 154D-F and/or VNFs 122C-D.

At step 604, the method 600 can involve monitoring one or more local VNFMs (e.g., L-VNFM 154D) on a local network (e.g., branch 210), cloud VNFMs (e.g., C-VNFM 154A), and/or cloud VNFs (e.g., VNFs 122A-B). For example, C-VNFM 154A can monitor any of L-VNFM 154D-F, VNFs 122A-B, and/or itself. In some cases, the method 600 can also involve monitoring VNFs on the local network (e.g., the branch 210). For example, C-VNFM 154A and/or L-VNFM 154D can monitor VNFs 122C-D. The monitoring can be based on load and/or status metrics collected for the monitored items.

Based on the monitoring, at step 606, the method 600 can involve determining a first status of the local VNFM(s) (e.g., L-VNFM 154D) and a second status of the cloud VNFM(s) (e.g., C-VNFM 154A) and/or the one or more cloud VNFs (e.g., VNFs 122A-B). The method 600 can also involve determining a respective status of the local network, such as the branch 210, and/or VNFs on the local network, such as VNFs 122C-D on the branch 210. The status can be a load status, such as an underload status or an overload status as previously explained in methods 500 and 520. The status can also be determined based on a threshold, such as an overload threshold and an underload threshold as previously explained in methods 500 and 520.

Based on the first status and the second status, at step 608, the method 600 can involve scaling one or more of the local VNFMs (e.g., L-VNFM 154D), the cloud VNFMs (e.g., C-VNFM 154A), and/or the one or more cloud VNFs (e.g., VNFs 122A-B). The method 600 can also involve scaling the local network (e.g., the branch 210) and/or local VNFs (e.g., VNFs 122C-D on the branch 210) based on the respective load status of the local network and local VNFs. For example, C-VNFM 154A can scale itself, L-VNFM 154D-F, VNFs 122A-D, and/or the branch 210 based on a respective status of each.

The scaling can be triggered by a respective threshold status. Thus, the method 600 can trigger the scaling when a status is satisfies the threshold status. For example, C-VNFM 154A can trigger a scaling in operation for L-VNFM 154D when a respective status (e.g., load status) of L-VNFM 154D meets a threshold underload status, or a scaling out operation for L-VNFM 154D when the respective status of L-VNFM 154D meets a threshold overload status.

In some cases, the scaling can also be based on a respective VNFM lifecycle management status. For example, C-VNFM 154A can determine a VNFM lifecycle management status of L-VNFM 154D before scaling L-VNFM 154D. C-VNFM 154A can then scale L-VNFM 154D based on the load status and VNFM lifecycle management status of L-VNFM 154D. To illustrate, if L-VNFM 154D is performing a lifecycle management operation (e.g., scaling an associated VNF), C-VNFM 154A can pause or stop the scaling of L-VNFM 154D, or recalculate the load status of L-VNFM 154D based on the load associated with the lifecycle management operation.

For example, C-VNFM 154A may determine that the load status of L-VNFM 154D does not satisfy an underloaded threshold. However, if L-VNFM 154D is performing a lifecycle management operation when C-VNFM 154A calculated the load status of L-VNFM 154D, the load status calculated may only reflect a temporary state of L-VNFM 154D. Accordingly, C-VNFM 154A may calculate a load associated with the lifecycle management operation and subtract that load from the load status of L-VNFM 154D. The recalculated load status may then be lower than previously calculated. In some cases, C-VNFM 154A may determine that the recalculated load status satisfies an underloaded load status/threshold and thereafter scale in L-VNFM 154D. Similarly, after determining that a load status of L-VNFM 154D satisfies an overloaded status/threshold, C-VNFM 154A may determine that the load status was calculated during a lifecycle management operation, and thereafter recalculate the load status to remove the load associated with the lifecycle management operation and determine that the overloaded status/threshold has not been satisfied by the recalculated load status.

In some cases, the method 600 may only perform scaling operations when a service to be scaled is not performing a lifecycle management operation. In other cases, the method 600 can perform the scaling operations event if the service is performing a lifecycle management operation and the load status used to trigger the scaling reflects a load associated with such lifecycle management operation. The method 600 can also determine whether a service is scheduled to perform a lifecycle management operation and/or has recently performed a lifecycle management operation and take that into account when deciding whether to scale a service or resource. For example, the method 600 may scale out a VNFM in anticipation of a lifecycle management operation, or pause scaling in anticipation of the lifecycle management operation. The method 600 may also wait a period of time after a lifecycle management operation before scaling, calculating a load status, recalculating a load status, etc.

The scaling operation can include scaling in/out a service and/or resource. For example, a scaling out operation can involve adding one or more service instances and/or resources for a service, and a scaling in operation can involve removing one or more service instances and/or resources for the service.

In some cases, a VNFM can be deployed or can include a cluster of VNFMs. For example, a plurality of VNFMs can together make up a single VNFM, such as C-VNFM 154A or L-VNFM 154D. Moreover, each VNFM can include a cluster of VNFM components (e.g., VMs, compute resources, services, etc.). In some cases, a VNFM can include a cluster of VNFMs, and each VNFM can include a cluster of VNFM components. In this example, the method 600 can perform scaling of the VNFM as a whole or scale one or more specific VNFMs in the cluster of VNFMs and/or one or more specific VNFM components in one or more specific clusters of VNFM components.

For example, L-VNFM 154D can include a cluster of L-VNFMs, and each L-VNFM can include a cluster of VNFM components. In this example, C-VNFM 154A can monitor each L-VNFM in the cluster of L-VNFMs associated with L-VNFM 154D and/or each VNFM component in one or more L-VNFMs in the cluster of L-VNFMs associated with L-VNFM 154D. C-VNFM 154A can determine a respective status of each L-VNFM and/or L-VNFM component monitored and, based on the respective status of each, scale one or more L-VNFMs and/or L-VNFM components.

In some cases, the method 600 can also involve maintaining a ratio of active/inactive VNFMs and/or VNFs. For example, the method 600 can involve deploying an N:M ratio of active/inactive VNFM instances to increase redundancy, availability, stability, recovery, etc. If a VNFM instance fails, the method 600 can have a number of available inactive VNFM instances it can use to replace the failed VNFM instance, and seamlessly replace the failed VNFM instance with an inactive VNFM instance. The method 600 can also quickly scale out the VNFM instance when necessary using the inactive VNFM instances.

To illustrate, the method 600 can involve configuring an active/inactive ratio (e.g., N:M) of VNFM instances for C-VNFM 154A and/or L-VNFM 154D. The inactive VNFM instances can be deployed on the cloud 280 and/or the branch 210, and can be configured for standby. The method 600 can then involve monitoring the VNFM instances, and determining a current active/inactive ratio of the VNFM instances to determine whether the current active/inactive ratio has gone below or above the configured active/inactive ratio (e.g., as a result of VNFM instances being deployed, removed, etc.). If the method 600 identifies a difference between the active/inactive ratio of VNFM instances configured and the current active/inactive ratio of VNFM instances, the method 600 can adjust the current number of active and/or inactive VNFM instances to reach the configured active/inactive ratio and maintain the active/inactive ratio as configured.

Figure 7:
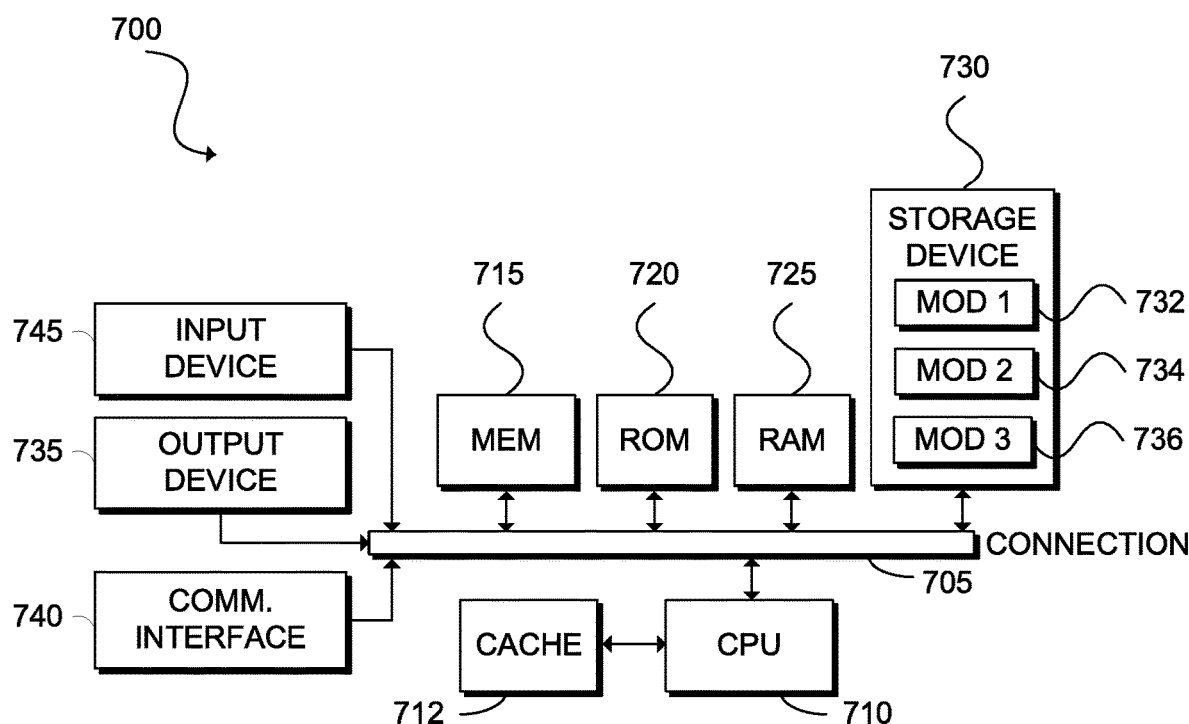
FIG. 7 illustrates an example architecture of a computing system.
Figure 8:
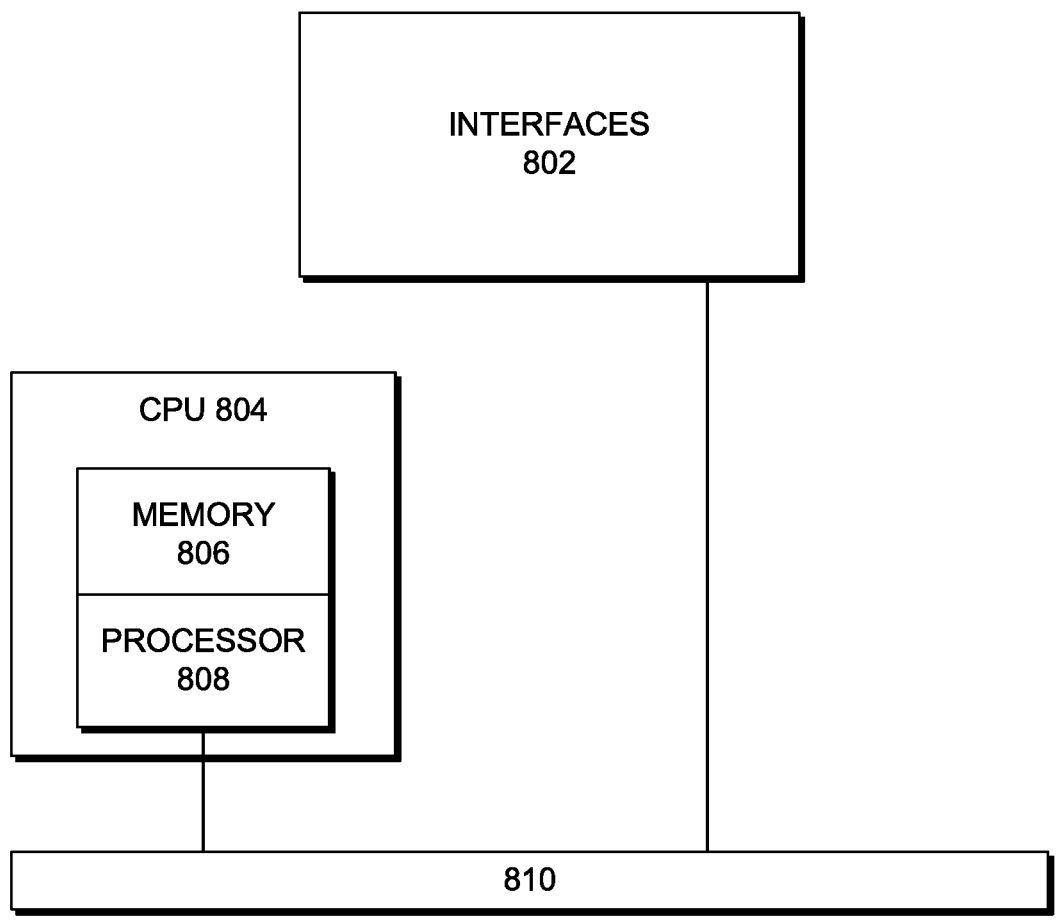
FIG. 8 illustrates an example network device.

The disclosure now turns to FIGS. 7 and 8, which illustrate example computing and network devices, such as switches, routers, load balancers, servers, client computers, and so forth.

FIG. 7 illustrates an example architecture for a computing system 700. Computing system 700 can include central processing unit (CPU) 710 and system connection 705 (e.g., BUS) that may couple various system components including system memory 715, memory (ROM) 720, and random access memory (RAM) 725, to CPU 710. Computing system 700 can include cache 712 of high-speed memory connected directly with, in close proximity to, or integrated as part of CPU 710. Computing system 700 can copy data from memory 715 and/or storage device 730 to cache 712 for quick access by CPU 710. In this way, cache 712 can provide a performance boost that avoids processor delays while waiting for data. These and other modules can control CPU 710 to perform various actions. Other system memory may be available for use as well. Memory 715 can include multiple different types of memory with different performance characteristics. CPU 710 can include any general purpose processor and a hardware module or software module configured to control CPU 710 as well as a special-purpose processor where software instructions are incorporated into the actual processor design. CPU 710 may essentially be a completely self-contained computing system, containing multiple cores or processors, a bus, memory controller, cache, etc. A multi-core processor may be symmetric or asymmetric.

To enable user interaction with computing system 700, input device 745 can represent any number of input mechanisms, such as a microphone for speech, a touch-protected screen for gesture or graphical input, keyboard, mouse, motion input, speech and so forth. Output device 735 can also be one or more of a number of output mechanisms known to those of skill in the art. In some instances, multimodal systems can enable a user to provide multiple types of input to communicate with computing system 700. Communications interface 740 can govern and manage the user input and system output. There may be no restriction on operating on any particular hardware arrangement and therefore the basic features here may easily be substituted for improved hardware or firmware arrangements as they are developed.

Storage device 730 can be a non-volatile memory and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and hybrids thereof. Storage device 730 can include software modules 732, 734, 736 for controlling CPU 710.

In some embodiments, a computing system that performs a particular function can include the software component stored in a computer-readable medium in connection with the necessary hardware components, such as CPU 710, connection 705, output device 735, and so forth, to carry out the function.

One of ordinary skill in the art will appreciate that computing system 700 can have more than one processor 710 or can be part of a group or cluster of computing devices networked together to provide greater processing capability.

FIG. 8 illustrates an example network device 800 suitable for performing switching, routing, assurance, and other networking operations. Network device 800 includes a central processing unit (CPU) 804, interfaces 802, and a connection 810 (e.g., a PCI bus). When acting under the control of appropriate software or firmware, the CPU 804 is responsible for executing packet management, error detection, and/or routing functions. The CPU 804 preferably accomplishes all these functions under the control of software including an operating system and any appropriate applications software. CPU 804 may include one or more processors 808, such as a processor from the INTEL X86 family of microprocessors. In some cases, processor 808 can be specially designed hardware for controlling the operations of network device 800. In some cases, a memory 806 (e.g., non-volatile RAM, ROM, TCAM, etc.) also forms part of CPU 804. However, there are many different ways in which memory could be coupled to the system. In some cases, the network device 800 can include a memory and/or storage hardware, such as TCAM, separate from CPU 804. Such memory and/or storage hardware can be coupled with the network device 800 and its components via, for example, connection 810.

The interfaces 802 are typically provided as modular interface cards (sometimes referred to as "line cards"). Generally, they control the sending and receiving of data packets over the network and sometimes support other peripherals used with the network device 800. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 804 to efficiently perform routing computations, network diagnostics, security functions, etc.

Although the system shown in FIG. 8 is one specific network device of the present disclosure, it is by no means the only network device architecture on which the concepts herein can be implemented. For example, an architecture having a single processor that handles communications as well as routing computations, etc., can be used. Further, other types of interfaces and media could also be used with the network device 800.

Regardless of the network device's configuration, it may employ one or more memories or memory modules (including memory 806) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 806 could also hold various software containers and virtualized execution environments and data.

The network device 800 can also include an application-specific integrated circuit (ASIC), which can be configured to perform routing, switching, and/or other operations. The ASIC can communicate with other components in the network device 800 via the connection 810, to exchange data and signals and coordinate various types of operations by the network device 800, such as routing, switching, and/or data storage operations, for example.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described embodiment can reside within computer-executable instructions stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media used to store instructions, information used, and/or information created during methods according to described examples can include magnetic or optical disks, flash memory, USB devices provided with non-volatile memory, networked storage devices, and so on.

Devices implementing methods according to the present disclosure can comprise hardware, firmware, and/or software, and can take any of a variety of form factors. Typical examples of such form factors include laptops, smart phones, small form factor personal computers, personal digital assistants, rack-mount devices, standalone devices, and so on. Functionality described in the present disclosure can also reside in peripherals or add-in cards. Such functionality can also reside on a circuit board among different chips or different processes executing in a single device, by way of further example. The instructions, media for conveying such instructions, computing resources for executing them, and other structures for supporting such computing resources are means for providing the functions described in these disclosures.

Although a variety of examples and other information explain aspects within the scope of the appended claims, one of ordinary skill will understand not to imply any limitation based on particular features or arrangements in such examples, as one of ordinary skill would be able to use these examples to derive a wide variety of implementations. Further and although the present disclosure may describe some subject matter in language specific to examples of structural features and/or method steps, one of ordinary skill will understand that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B (i.e., one or more of A, one or more of B, or one or more of A and B). Moreover, claim language reciting "one or more of A and B" means A, B, or A and B (i.e., one or more of A, one or more of B, or one or more of A and B).

What is claimed is:

1. A method comprising:
    deploying a cloud virtual network function manager (VNFM) and one or more cloud virtual network functions (VNFs);
    monitoring, by the cloud VNFM, at least one local VNFM on a local network, the cloud VNFM, and the one or more cloud VNFs;
    based on the monitoring, determining, by the cloud VNFM, a first status of the at least one local VNFM and a second status of the cloud VNFM and the one or more cloud VNFs; and
    based on the first status and the second status, scaling, by the cloud VNFM, one or more of the at least one local VNFM, the cloud VNFM and the one or more cloud VNFs, comprising:
        determining whether one of the local VNFMs having a load above or below a single common threshold;
        migrating, in response to the determining finding that the one of the local VNFMs has a load below the single common threshold, the one of the local VNFMs to a cloud network associated with the cloud VNFM; and
        in response to the determining finding that the one of the local VNFMs has a load above the single common threshold, sending, by the cloud VNFM to the at least one local VNFM, a second instruction to deploy one or more additional local VNFs on the local network.

2. The method of claim 1, wherein the at least one local VNFM comprises a cluster of local VNFMs, wherein each local VNFM in the cluster of local VNFMs comprises a respective cluster of local VNFM components, the method further comprising:
    monitoring each local VNFM in the cluster of local VNFMs;
    determining a respective status of each local VNFM component in the respective cluster of local VNFM components; and
    based on the respective status of each local VNFM component, scaling one or more local VNFM components in the respective cluster of local VNFM components associated with a respective local VNFM from the cluster of local VNFMs.

3. The method of claim 1, wherein the scaling comprises:
    monitoring, by the cloud VNFM, a plurality of local VNFs associated with the at least one local VNFM;
    determining, by the cloud VNFM, a respective status of at least one of the plurality of local VNFs; and
    scaling, by the cloud VNFM, the at least one of the plurality of local VNFs based on the respective status.

4. The method of claim 1, wherein scaling the one or more of the at least one local VNFM and the at least one of the cloud VNFM and the one or more cloud VNFs comprises scaling the at least one local VNFM, the method further comprising:
    determining at least one of a respective load and a respective VNFM lifecycle management status associated with the at least one local VNFM; and
    scaling the at least one local VNFM based on the at least one of the respective load and the respective VNFM lifecycle management status.

5. The method of claim 4, wherein the respective VNFM lifecycle management status is determined based on one or more lifecycle management operations at the at least one local VNFM, the one or more lifecycle management operations being associated with one or more local VNFs on the local network, wherein scaling the at least one local VNFM is based on the respective VNFM lifecycle management status.

6. The method of claim 5, wherein scaling the at least one local VNFM is based on the respective VNFM lifecycle management status comprises scaling the at least one local VNFM only when the respective VNFM lifecycle management status indicates at least one of:
    the at least one local VNFM is not currently performing a lifecycle management operation associated with at least one of the one or more local VNFs and the at least one local VNFM;
    the at least one local VNFM is not scheduled to perform, at least within a first period of time, the lifecycle management operation associated with at least one of the one or more local VNFs and the at least one local VNFM; and
    the at least one local VNFM has not performed, at least within a second period of time, the lifecycle management operation associated with at least one of the one or more local VNFs and the at least one local VNFM.

7. The method of claim 1, further comprising:
    determining, by the cloud VNFM, an updated status of the cloud VNFM, the updated status indicating a load associated with the cloud VNFM; and scaling the cloud VNFM based on the updated status, wherein scaling the cloud VNFM comprises scaling out the cloud VNFM when the load is above a threshold and scaling in the cloud VNFM when the load is below the threshold.

8. The method of claim 1, wherein the cloud VNFM is associated with a cloud, the method further comprising:
configuring an active/inactive ratio of VNFM elements associated with at least one of the local network and the cloud, the VNFM elements comprising at least one of VNFMs, VNFM components, and VNFs, the active/inactive ratio of VNFM elements comprising a first number of active VNFM elements deployed in at least one of the local network and the cloud and a second number of standby VNFM elements deployed in at least one of the local network and the cloud;
monitoring the VNFM elements associated with the at least one of the local network and the cloud;
determining a current active/inactive ratio of the VNFM elements based on a first current number of active VNFM elements deployed in the at least one of the local network and the cloud and a second current number of standby VNFM elements deployed in the at least one of the local network and the cloud;
determining a difference between the active/inactive ratio of VNFM elements and the current active/inactive ratio of VNFM elements; and
in response to determining the difference, adjusting at least one of the first current number of active VNFM elements deployed in the at least one of the local network and the cloud or the second current number of standby VNFM elements deployed in the at least one of the local network and the cloud to yield an updated active/inactive ratio of VNFM elements, the updated active/inactive ratio of VNFM elements being based on the active/inactive ratio of VNFM elements.

9. A system comprising:
one or more processors; and
at least one computer-readable storage medium including instructions that, when executed by the one or more processors, cause the system to:
deploy a cloud virtual network function manager (VNFM) and one or more cloud virtual network functions (VNFs);
monitor, via the cloud VNFM, at least one local VNFM on a local network, the cloud VNFM, and the one or more cloud VNFs;
based on the monitoring, determine, via the cloud VNFM, a first status of the at least one local VNFM and a second status of the cloud VNFM and the one or more cloud VNFs; and
based on the first status and the second status, scale, via the cloud VNFM, one or more of the at least one local VNFM, the cloud VNFM, and the one or more cloud VNFs, comprising:
determine whether one of the local VNFMs having a load above or below a single common threshold;
migrate, in response to the determine finding that the one of the local VNFMs has a load below the single common threshold, the one of the local VNFMs to a cloud network associated with the cloud VNFM; and
in response to the determine finding that the one of the local VNFMs has a load above the single common threshold, send, by the cloud VNFM to the at least one local VNFM, a second instruction to deploy one or more additional local VNFs on the local network.

10. The system of claim 9, wherein the at least one local VNFM comprises a cluster of local VNFMs, wherein each local VNFM in the cluster of local VNFMs comprises a respective cluster of local VNFM components, the at least one computer-readable storage medium including instructions that, when executed by the one or more processors, cause the VNFM to:
monitor each local VNFM in the cluster of local VNFMs;
determine a respective status of each local VNFM component in the respective cluster of local VNFM components; and
based on the respective status of each local VNFM component, scale one or more local VNFM components in the respective cluster of local VNFM components associated with a respective local VNFM from the cluster of local VNFMs.

11. The system of claim 9, wherein the scale comprises:
monitor a plurality of local VNFs associated with the local network;
determine a respective status of at least one of the plurality of local VNFs; and
based on the respective status, scale the at least one of the plurality of local VNFs.

12. The system of claim 9, the at least one computer-readable storage medium including instructions that, when executed by the one or more processors, cause the VNFM to:
determine at least one of a respective load and a respective VNFM lifecycle management status associated with the at least one local VNFM; and
scale the at least one local VNFM based on the at least one of the respective load and the respective VNFM lifecycle management status.

13. The system of claim 12, wherein the respective VNFM lifecycle management status is determined based on one or more lifecycle management operations at the at least one local VNFM, the one or more lifecycle management operations being associated with one or more local VNFs on the local network, wherein scaling the at least one local VNFM is based on the respective VNFM lifecycle management status.

14. The system of claim 13, wherein scaling the at least one local VNFM based on the respective VNFM lifecycle management status comprises scaling the at least one local VNFM only when the respective VNFM lifecycle management status indicates at least one of:
the at least one local VNFM is not currently performing a lifecycle management operation associated with at least one of the one or more local VNFs and the at least one local VNFM;
the at least one local VNFM is not scheduled to perform, at least within a first period of time, the lifecycle management operation associated with at least one of the one or more local VNFs and the at least one local VNFM; and
the at least one local VNFM has not performed, at least within a second period of time, the lifecycle management operation associated with at least one of the one or more local VNFs and the at least one local VNFM.

15. A non-transitory computer-readable medium comprising:
one or more processors; and
instructions stored thereon which, when executed by the one or more processors, cause the one or more processors to:

deploy a cloud virtual network function manager (VNFM) and one or more cloud virtual network functions (VNFs);

monitor, via the cloud VNFM, at least one local VNFM on a local network, the cloud VNFM, and the one or more cloud VNFs;

based on the monitoring, determine, via the cloud VNFM, a first status of the at least one local VNFM and a second status of the cloud VNFM and the one or more cloud VNFs; and based on the first status and the second status, scale, via the cloud VNFM, one or more of the at least one local VNFM, the cloud VNFM and the one or more cloud VNFs, comprising:

determine whether one of the local VNFMs having a load above or below a single common threshold;

migrate, in response to the determine finding that the one of the local VNFMs has a load below the ingle common threshold, the one of the local VNFMs to a cloud network associated with the cloud VNFM; and in response to the determine finding that the one of the local VNFMs has a load above the ingle common threshold, send, by the cloud VNFM to the at least one local VNFM, a second instruction to deploy one or more additional local VNFs on the local network.

16. The non-transitory computer-readable medium of claim 15, wherein the at least one local VNFM comprises a cluster of local VNFMs, wherein each local VNFM in the cluster of local VNFMs comprises a respective cluster of local VNFM components, the non-transitory computer-readable medium storing instructions that, when executed by the one or more processors, cause the one or more processors to:

monitor each local VNFM in the cluster of local VNFMs;

determine a respective status of each local VNFM component in the respective cluster of local VNFM components; and based on the respective status of each local VNFM component, scale one or more local VNFM components in the respective cluster of local VNFM components associated with a respective local VNFM from the cluster of local VNFMs.

17. The non-transitory computer-readable medium of claim 15, wherein the scale comprises:

monitor a plurality of local VNFs associated with the local network, wherein the respective status comprises a respective load of the at least one of the plurality of local VNFs;

determine a respective status of at least one of the plurality of local VNFs; and based on the respective status, scale the at least one of the plurality of local VNFs, wherein scale the at least one of the plurality of local VNFs comprises:

in response to the respective load is above a threshold, sending, via the cloud VNFM, to the at least one local VNFM, a second instruction to deploy one or more local VNFs on the local network.

18. The non-transitory computer-readable medium of claim 15, storing instructions that, when executed by the one or more processors, cause the one or more processors to:

configuring an active/inactive ratio of VNFM elements associated with at least one of the local network and a cloud, the VNFM elements comprising at least one of VNFMs, VNFM components, and VNFs, the active/inactive ratio of VNFM elements comprising a first number of active VNFM elements deployed in at least one of the local network and the cloud and a second number of standby VNFM elements deployed in at least one of the local network and the cloud;

monitoring the VNFM elements associated with the at least one of the local network and the cloud;

determining a current active/inactive ratio of the VNFM elements based on a third number of active VNFM elements deployed in the at least one of the local network and the cloud and a fourth number of standby VNFM elements deployed in the at least one of the local network and the cloud;

determining a difference between the active/inactive ratio of VNFM elements and the current active/inactive ratio of VNFM elements; and in response to determining the difference, adjusting at least one of the third number of active VNFM elements deployed in the at least one of the local network and the cloud or the fourth number of standby VNFM elements deployed in the at least one of the local network and the cloud, to yield an updated active/inactive ratio of VNFM elements, the updated active/inactive ratio of VNFM elements being based on the active/inactive ratio of VNFM elements.

\* \* \* \* \*